(12) United States Patent
Hall et al.

(10) Patent No.: US 11,752,983 B2
(45) Date of Patent: Sep. 12, 2023

(54) MOBILE VEHICLE FUELING SYSTEM

(71) Applicant: Hall Labs LLC, Provo, UT (US)

(72) Inventors: David R. Hall, Provo, UT (US);
Stephen Hall, Draper, UT (US); Jeff Duncan, Provo, UT (US); Joe Fox, Spanish Fork, UT (US)

(73) Assignee: Vanderhall Motorworks, Inc., Provo, UT (US)

( * ) Notice: Subject to any disclaimer, the term of this patent is extended or adjusted under 35 U.S.C. 154(b) by 573 days.

(21) Appl. No.: 16/784,807

(22) Filed: Feb. 7, 2020

(65) Prior Publication Data

US 2021/0245719 A1 Aug. 12, 2021

(51) Int. Cl.
| | |
|---|---|
| *B60S 5/02* | (2006.01) |
| *B64C 39/02* | (2023.01) |
| *B67D 7/04* | (2010.01) |
| *G05D 1/02* | (2020.01) |
| *G05D 1/10* | (2006.01) |

(Continued)

(52) U.S. Cl.
CPC .............. *B60S 5/02* (2013.01); *B64C 39/024* (2013.01); *B67D 7/0401* (2013.01); *G05D 1/0297* (2013.01); *G05D 1/104* (2013.01); *G06Q 30/0635* (2013.01); *G06Q 50/06* (2013.01); *G07C 5/0808* (2013.01); *B64U 2101/60* (2023.01); *B67D 2007/0436* (2013.01); *B67D 2007/0442* (2013.01)

(58) Field of Classification Search
CPC ... B60S 5/02; B64C 39/024; B64C 2201/128; B64C 2201/027; B64C 2201/042; B67D 7/0401; B67D 2007/0436; B67D 2007/0442; G05D 1/0297; G05D 1/104; G06Q 30/0635; G06Q 50/06; G07C 5/0808; G07C 5/008

See application file for complete search history.

(56) References Cited

U.S. PATENT DOCUMENTS 10,836,250 B2 * 11/2020 Maruthapillai ........ B60K 15/00
2012/0303397 A1 * 11/2012 Prosser ................... B60L 53/18
705/7.12

(Continued)

OTHER PUBLICATIONS

Booster Fuels Website found at https://www.trybooster.com/.
Filld Website found at https://filld.com/.

*Primary Examiner* — Frederick M Brushaber

(57) ABSTRACT

The invention is a mobile fueling system for vehicles that includes a fleet of mobile fuel stations, such as trucks. Each mobile fuel station has at least one fuel reservoir adapted for storing either liquid fuel, gaseous fuel and electric fuel. The system also includes a data processing hub and a network providing wireless data communication between vehicles, the fleet of mobile fuel stations, and the data processing hub. The data processing hub receives vehicle data from vehicles and fleet data from each mobile fuel station over the network. The vehicle data is transmitted from a customer's smart device running a customer app. The data processing hub is configured to dispatch via the network the mobile fuel stations in the fleet to vehicles in need of fuel based on at least three of the following factors: vehicle fuel level, a vehicle fuel request, vehicle location, a vehicle owner stored fueling location preference, a vehicle owner service request, reservoir fuel contents, reservoir fuel level and mobile fuel station location.

21 Claims, 18 Drawing Sheets

(51) Int. Cl.
   *G06Q 50/06*     (2012.01)
   *G07C 5/08*      (2006.01)
   *G06Q 30/0601*   (2023.01)
   *B64U 101/60*    (2023.01)

(56) References Cited

U.S. PATENT DOCUMENTS

| | | |
|---|---|---|
| 2018/0075567 A1 | 3/2018 | Mycroft |
| 2018/0107975 A9 * | 4/2018 | Miller .................... G06Q 50/06 |
| 2018/0300823 A1 | 10/2018 | Aubuchon et al. |
| 2018/0339682 A1 * | 11/2018 | Hall ..................... G06Q 20/145 |
| 2020/0043063 A1 * | 2/2020 | London ................ G05D 1/0088 |
| 2021/0245719 A1 * | 8/2021 | Hall ...................... B64C 39/024 |

\* cited by examiner

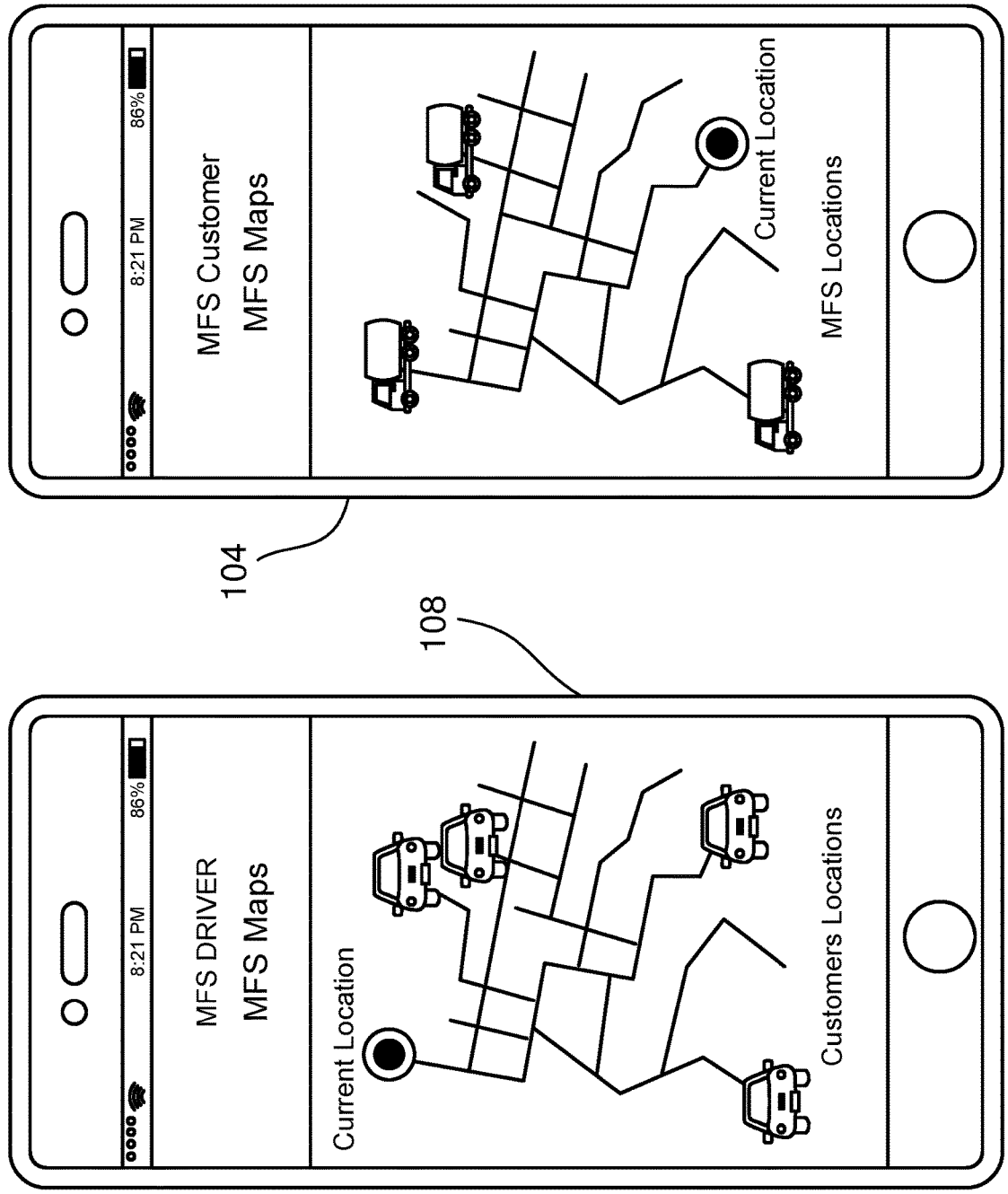

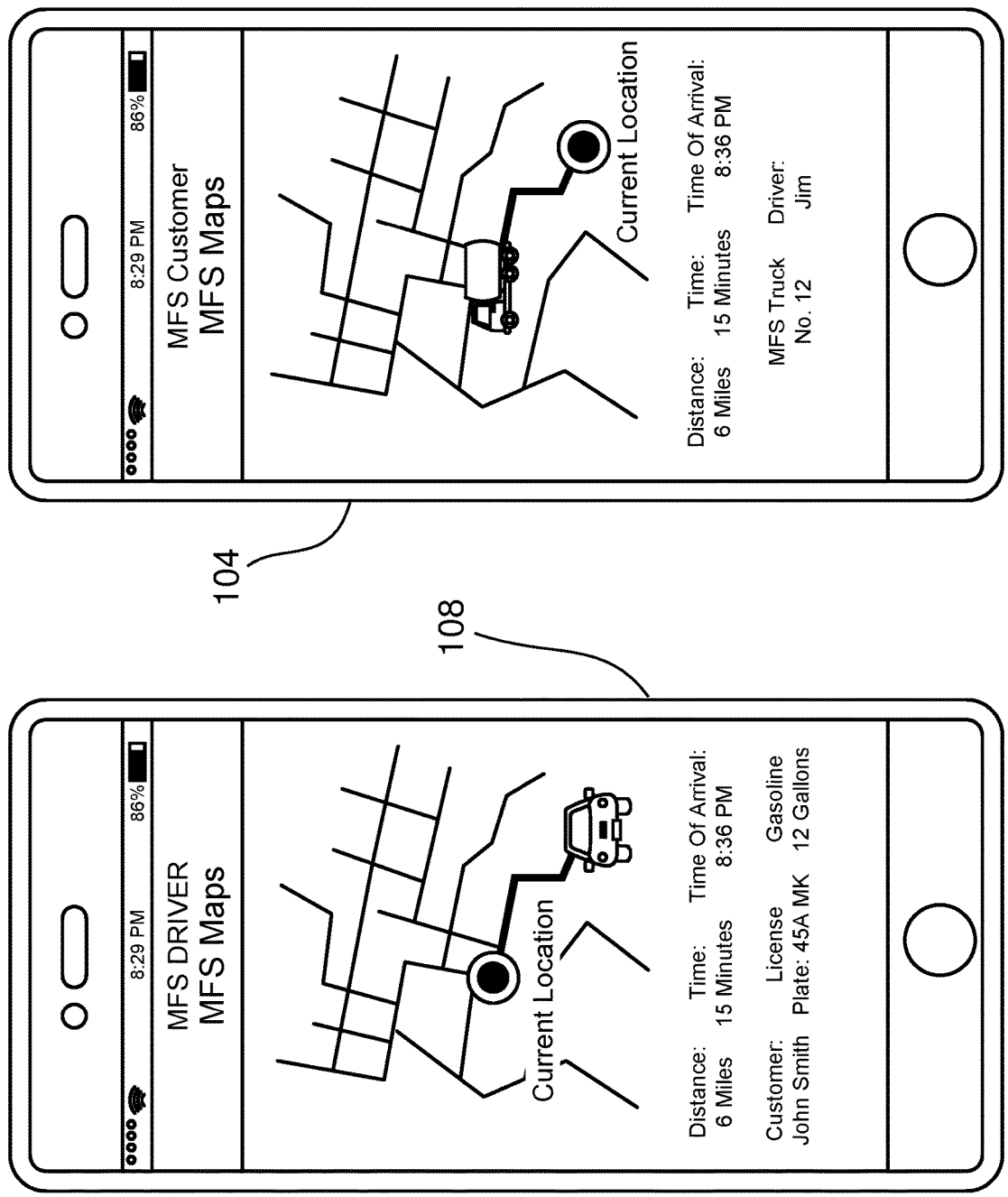

MOBILE VEHICLE FUELING SYSTEM

CROSS-REFERENCE TO RELATED APPLICATIONS

This application is a Continuation of U.S. patent application Ser. No. 16/051,704, filed Aug. 1, 2018, entitled Mobile Vehicle Fueling System, which application, in turn, was a Continuation-in-Part of U.S. patent application Ser. No. 15/188,186, filed Jun. 21, 2016, published as US 2017/0362076 and issued as U.S. Pat. No. 10,046,962 and entitled Mobile Vehicle Refueling System. The entire disclosures of these applications are incorporated herein by reference.

TECHNICAL FIELD

This invention relates to systems for fueling vehicles.

BACKGROUND

The majority of motorized vehicles (land, sea, and air) consume a combustible form of fuel, usually in liquid or gaseous form. The remaining vehicles typically run on electricity and rely on some type of battery to operate. In either case, almost all vehicles require some form of fueling involving either the refilling of a fuel tank with a combustible fuel or the recharging or replacing of a battery.

Fueling generally takes place at dedicated locations such as gas stations and charging stations that vehicles must travel to when needing fuel. This travel to a dedicated fuel station can be inefficient as it costs time and energy. Also, the more convenient the locations for dedicated fuel stations typically require purchase or lease of expensive real estate to build on. Some otherwise prime locations for fuel stations are not even available due to zoning regulations. These factors can result in either higher fuel prices or a total absence of fuel stations in pricier or restricted areas. Consequently, some vehicles are required to travel even farther to a fuel station or choose to travel farther to get lower fuel prices.

Another inefficiency of the typical dedicated fuel station is the time the customer may spend waiting for an available pump and the time spent while the fueling is taking place.

Yet another inefficiency of the typical dedicated fuel stations is the uneven usage throughout the day. Some fuel stations remain open 24/7 yet receive most usage during certain peak hours corresponding to commuting times. This is not the most efficient use of the capital invested in the fuel station or the manpower to operate it.

SUMMARY

The invention is a mobile fueling system for vehicles that includes a fleet of mobile fuel stations, such as trucks. Each mobile fuel station has at least one fuel reservoir adapted to store a fuel type selected from the group consisting of liquid fuel, gaseous fuel and electric fuel. The mobile fuel station is equipped with dispensing hardware, such as hoses and/or cables, adapted to dispense the fuel type from the at least one fuel reservoir to a vehicle. The system also includes a data processing hub and a network providing wireless data communication between vehicles and the data processing hub, the between the fleet of mobile fuel stations and the data processing hub. The data processing hub is configured to receive vehicle data from vehicles over the network, which vehicle data which vehicle data is transmitted from a customer's smart device running a customer app and wherein the vehicle data includes at least vehicle owner identification, vehicle fuel level and vehicle location. The data processing hub is also configured to receive fleet data from each mobile fuel station in the fleet over the network, which fleet data includes an identifier for each mobile fuel station, fuel level for each fuel reservoir, and location for each mobile fuel station. The data processing hub is further configured to dispatch, via the network, the mobile fuel stations in the fleet to vehicles in need of fuel based on at least three of the following factors: vehicle fuel level, a vehicle fuel request, vehicle location, a vehicle owner stored fueling location preference, a vehicle owner service request, reservoir fuel contents, reservoir fuel level and mobile fuel station location.

BRIEF DESCRIPTION OF THE DRAWINGS

The following drawings are provided to illustrate certain embodiments described herein. The drawings are merely illustrative, are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

FIG. 4A is a simulated screenshot of the MFS driver's app showing multiple potential customers;

FIG. 4B is a simulated screenshot of the customer's app showing the potential MFS trucks to fill the fuel order

FIG. 6A is a simulated screenshot of the MFS driver's app showing progress toward the customer;

FIG. 6B is a simulated screenshot of the customer's app showing the progress of the MFS truck toward the customer's location;

DETAILED DESCRIPTION

Figure 1:
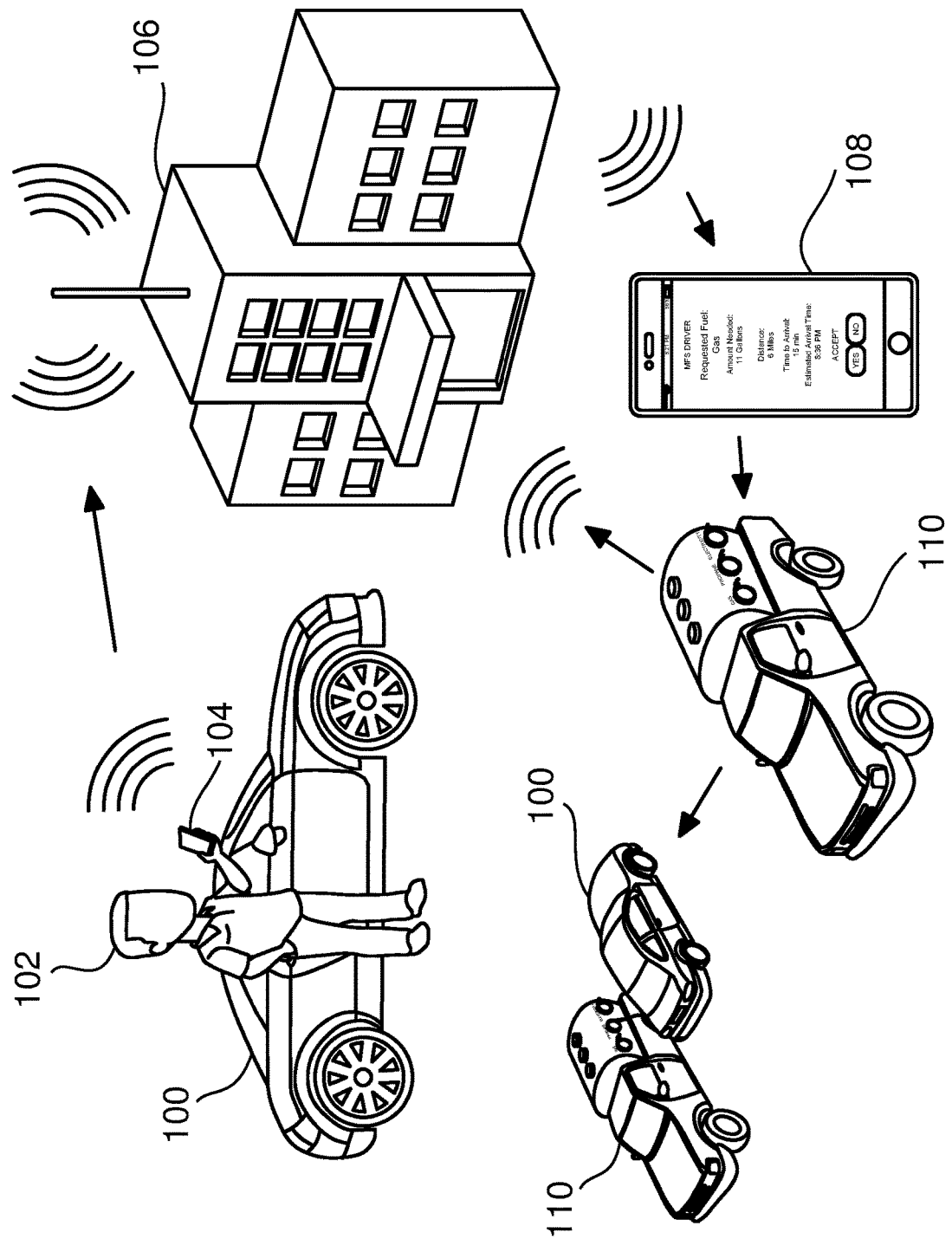
FIG. 1 is a system diagram of a mobile vehicle fueling system.

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, the term "fuel" is intended to have a relatively broad meaning, referring to liquid fuels such as gasoline, diesel, as well as gaseous fuels such as natural gas, propane or hydrogen. Fuel is also meant to refer to electric energy, such as a charge applied to a battery or charged battery pack to replace a depleted battery pack.

By the same token, the terms "fueling" and "refueling" are intended to have broad meanings, referring to supplying any of the fuels mentioned above, whether that fuel is added by filling a tank or battery on the vehicle, or by swapping out a depleted container or battery for a refilled or recharged container or battery.

As used herein, the term "vehicle" is also intended to have a relatively broad meaning, referring to automobiles, whether driven by a human or autonomous, as well as other vehicles that travel on land, in water or through the air.

As used herein, the terms "driver of the vehicle," "owner of the vehicle" and "customer" are used interchangeably, unless otherwise indicated.

As used herein, the term "dispatch" is intended to have a relatively broad meaning, referring to the action of putting a fueling request together with a mobile fuel station. As will be discussed in detail below, the dispatching process can take various forms.

Referring to the drawings, FIG. 1 illustrates the basics of the preferred embodiment of the invention. In the preferred system, the driver 102 of the vehicle 100 is using a personal device 104, such as a smart phone running an app, to place an order for fueling service.

The order, which preferably includes vehicle owner identification, vehicle fuel type and amount requested and vehicle fueling location, is transmitted over a wireless network to a data processing hub in building 106. Preferably, the location of the vehicle is continuously updated to the data processing hub by means of a GPS radio in the vehicle or the vehicle owner's smart phone and transmitted over the wireless network.

The present invention makes use of a fleet of mobile fuel stations 110. The fleet may have as few as two mobile fuel stations, but preferably has more. The preferred number depends on factors such as the population and vehicle density, whether the area is underserved or overserved by convention fuel stations, the distances between supply stations and the areas to be served. To take advantage of economies of scale, it is preferred that the fleet includes at least 5 mobile fuel stations and more preferably at least 10. Most preferably, the fleet includes at least 20 mobile fuel stations.

The data processing hub in the building 106 preferably includes a computer running specialized software to carry out its functions. The amount of human interaction at the data processing hub depends on the sophistication of the software and specifics of the business model employed in the system.

For convenience, the wireless network preferably incorporates a typical cellular data network, such as 4G or LFE data. Alternatively, and depending on distances and obstacles, other types of wireless communications, such as the Sure-Fi® system or other radio systems can be used. For data storage and other purposes, the wireless network and data processing hub preferably incorporates a cloud-based server.

The data processing hub is configured to receive fleet data from each mobile fuel station 110 in the fleet over the wireless network. The fleet data should include an identifier for each mobile fuel station, fuel level for each fuel reservoir, as well as the location for each mobile fuel station. Preferably, the system takes advantage of the MFS driver's smart phone, which includes GPS capability and is running a specialized MFS driver's app, to track and identify each of the mobile fuel stations in the fleet. Alternatively, each mobile fuel station can be equipped with its own GPS and wireless communication device, in order for the system to track and identify the mobile fuel stations in the fleet.

Preferably, each mobile fuel station includes sensors that detect the level of fuel in each reservoir. Suitable sensors can measure the weight, pressure, charge or the physical level of the fuel in the reservoir. Those-sensor detected levels are preferably communicated to the data processing hub continually or periodically in real time, most preferably automatically over the MFS driver's app. Alternatively, the MFS driver can report his reservoir fuel levels, such as by entering it on the MFS driver's app.

In other alternative embodiments, the levels of fuel in each reservoir are communicated to the data processing hub indirectly. For example, in one embodiment, the data processing hub receives data when a fuel reservoir is refilled at a resupply depot, so as to "know" that the fuel reservoir is full at that point or to "know" how much fuel is in the reservoir. Subsequently, as the mobile fuel station dispenses fuel from that reservoir to a customer, that data, including the amount of fuel, is communicated to the data processing hub. The data processing hub then subtracts that amount from the level in the appropriate reservoir. In the embodiment where mobile fuel station exchanges charged battery packs or filled fuel containers for depleted ones in the customer's vehicle, the data processing hub receives that data and subtracts the appropriate number of charged battery packs or filled fuel containers from the level in the appropriate reservoir on that mobile fuel station.

The data processing hub is further configured to dispatch, via the wireless network, the mobile fuel stations 110 in the fleet to vehicles 100 in need of fuel. The dispatching, namely which mobile fuel station is sent to which vehicle for fueling, should be based on at least three of the factors in group including (a) vehicle fuel level, (b) a vehicle fuel request, (c) vehicle fueling location, (d) a vehicle owner stored preference, (e) reservoir fuel contents, (f) reservoir fuel level and (g) mobile fuel station location. Preferably, the dispatching is based on at least five of these factors. Most preferably, the dispatching is based on all of these factors and others. Another factor that is preferably used is real-time traffic information that would affect the time required for the mobile fuel station to travel to a fueling location. Still another factor that will preferably be used is the order information from one or more other vehicles with pending fueling requests combined with the locations and other data from the multiple mobile fuel stations in the fleet. In one embodiment, all of these factors are utilized so that the dispatching is done to achieve maximum efficiency of the fleet. Preferably, the analysis of these several factors and the dispatching "decision" is made by a computer running an algorithm to insure efficiency. Alternatively, the dispatching decision is made by a computer running an algorithm and providing options to that are acted on by a human operator.

In another embodiment, the system also allows for human selection as part of the dispatching process. For example, the driver of the vehicle 102, i.e. the customer, may have a favorite mobile fuel station driver (MFS driver). In such a system, the customer could check, via information provided by the data processing hub, to see if that MFS driver is available and what the delivery time would be for that favorite MFS driver.

Another example of allowing human selection to contribute to the dispatching process is to allow the MFS drivers to accept or reject certain fueling requests as they come in. In this embodiment of the system, the MFS drivers are independent contractors and thus, are given the choice, relayed from the data processing center, of filling certain orders or not. The decision of the MFS driver could be based on the fueling location requested, proximity to home, proximity to the resupply depot, proximity to other desired locations, whether or not the driver intends to take a break, etc. In this embodiment where the MFS drivers are given the option of accepting orders or not, the MFS drivers receive the information on potential orders from the data processing hub over a personal communication device 108, such as a smart phone running an app.

In the preferred embodiment, the system provides the fueling requests to multiple mobile fuel system drivers simultaneously. The app includes the function of allowing the MFS driver to accept or decline the order and transmit that decision back to the data processing hub. When an order has been accepted by one MFS driver, that order disappears from the other MFS drivers' screens, or lists of options.

In an alternative embodiment, the system provides each fueling request to only one MFS driver at a time. If that request is not accepted within a predetermined time limit, the request is automatically send to another MFS driver, which process is repeated until the fueling request is accepted by an MFS driver.

Once the dispatching decision has been made, the dispatching data is transmitted to the mobile fuel station 110 selected to fill the order. Preferably, the dispatching data includes the fueling location, identification of the vehicle and type of fuel to be supplied. Most preferably, the vehicle identification includes a description of the vehicle, including a photograph and the license plate number. The dispatching data preferably also include a photograph of the customer and a list of his or her preferences.

In an alternative embodiment, identification of a customer's vehicle may be made through the use of some form of tag placed on the vehicle when registered with the mobile fuel service. This tag is a simple QR code sticker or an RFID label. Alternatively, some type of identification beacon that emits a unique signal is installed in the vehicle.

Preferably, the dispatching data is transmitted to a driver of the mobile fuel station 110 via a personal communication device 108, such as a smart phone running an app. Alternatively, the dispatching data can be transmitted to a built-in display in the mobile fuel station 110.

Figure 2:
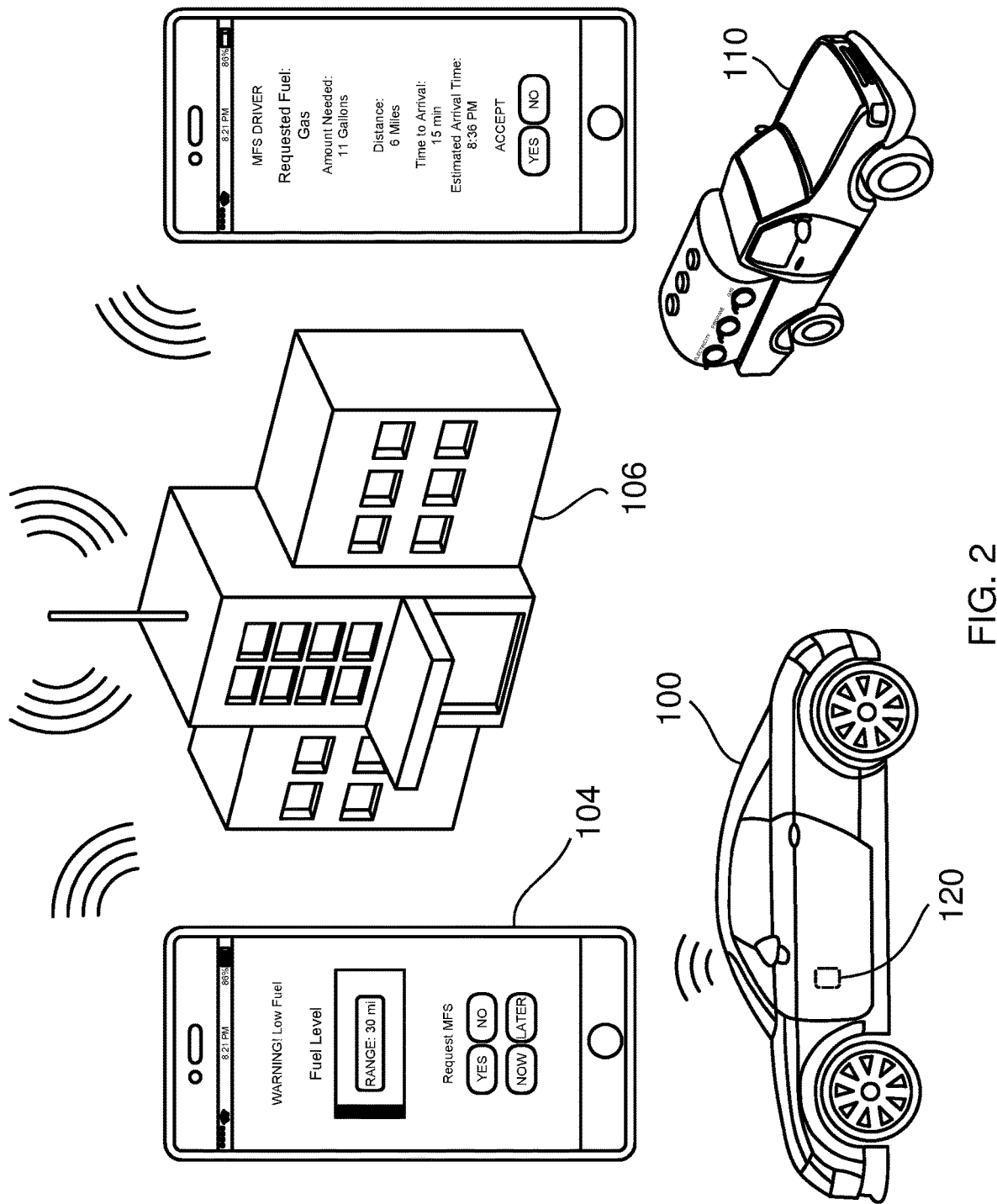
FIG. 2 is a system diagram illustrating the ordering and order accepting steps.

FIG. 2 illustrates a few additional elements of the preferred system. For one thing, the vehicle 100 preferably includes a sensor that automatically detects the fuel level of the vehicle. Most preferably, the sensor will work with other components in the vehicle to determine the estimated range of travel with the remaining fuel level. Preferably, the sensor works with a data link 120 that transmits the data on fuel level and range and transmits it, most preferably to the smart phone 104 running an app. Preferably, the data link plugs into the standard onboard diagnostic (OBD) port already found in most vehicles manufactured in the last 20 years. Most preferably, the data link 120 includes a blue tooth transceiver to communicate data with the customer's smart phone 104. Alternatively, the data link and smart phone communicates by other means, such as a cable.

Alternatively, the data link communicates directly with the data hub. In some embodiments, the data link is equipped with a GPS module, so that the location of the vehicle can be tracked independent of the vehicle owner's smart phone. In some embodiments, the data link includes the identification beacon mentioned above.

In another alternative embodiment, the system does not include a data link with the car and the vehicle driver just initiates the appropriate app when he notices his vehicle is running low on fuel. In this embodiment, the customer's app preferably transmits the fuel request, along with other data including location and vehicle identification information to the data processing hub.

In still another alternative embodiment, the system is automated to the extent that the data link or other unit on the vehicle communicates directly with the data processing hub its location and its fuel level. Preferably, the data processing hub also has access to historical data on the routes typically taken each day for the vehicle. Based on these data, the data processing hub determines the optimum time and location of a fueling service. The data processing hub then dispatches a mobile fuel station to perform the fueling service. The customer may be given notice of this service and may also be given the option to decline it.

As an example of this fully automated dispatching embodiment, the data processing hub may determine that a vehicle with a tank still one fourth full, nevertheless should receive a fuel service Thursday night at the vehicle owner's residence because the vehicle history shows that the vehicle sometimes takes long trips on Fridays. Alternatively, the customer is given the option to pre-program his preferences on the customer app, indicating things such as a request to have at least half a tank of fuel on Friday mornings.

Preferably, when the sensor detects a low fuel level and the data link 120 sends the appropriate signal to the smart phone 104, the appropriate app is initiated. In the preferred embodiment, the vehicle driver sees the low fuel warning and is given an option, through the app, to request a fueling. Preferably, the app will also give the vehicle driver an option of whether to receive a fueling service now or later.

Figure 3C:
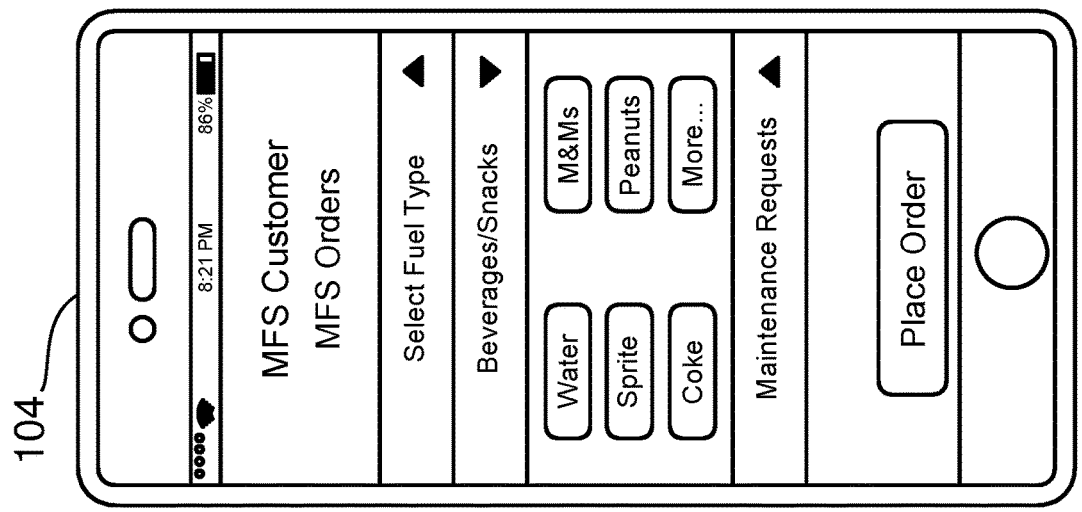
FIG. 3C is a simulated screenshot of the customer's app snacks ordering screen.
Figure 3B:
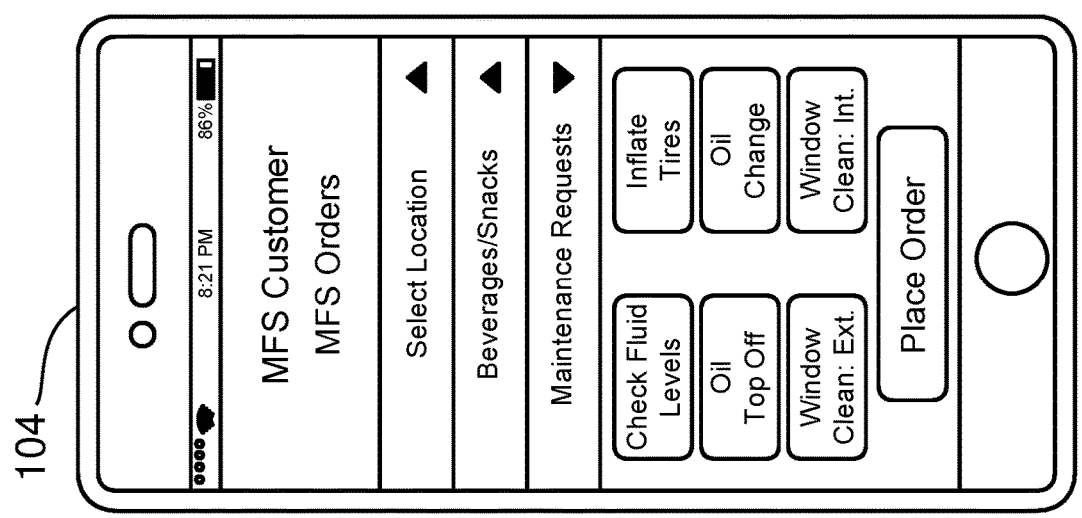
FIG. 3B is a simulated screenshot of the customer's app service ordering screen.
Figure 3A:
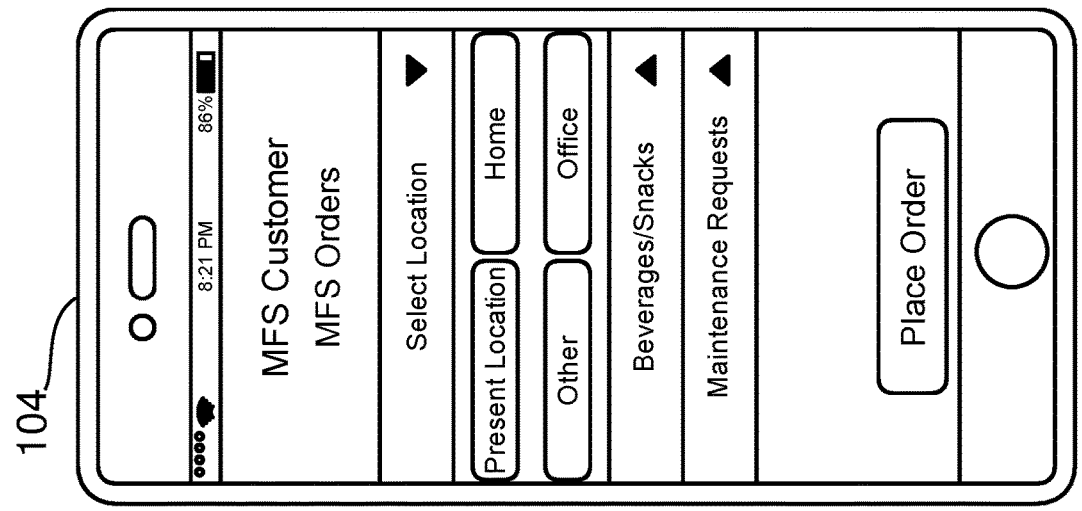
FIG. 3A is a simulated screenshot of the customer's app fuel ordering screen.
Figure 7:
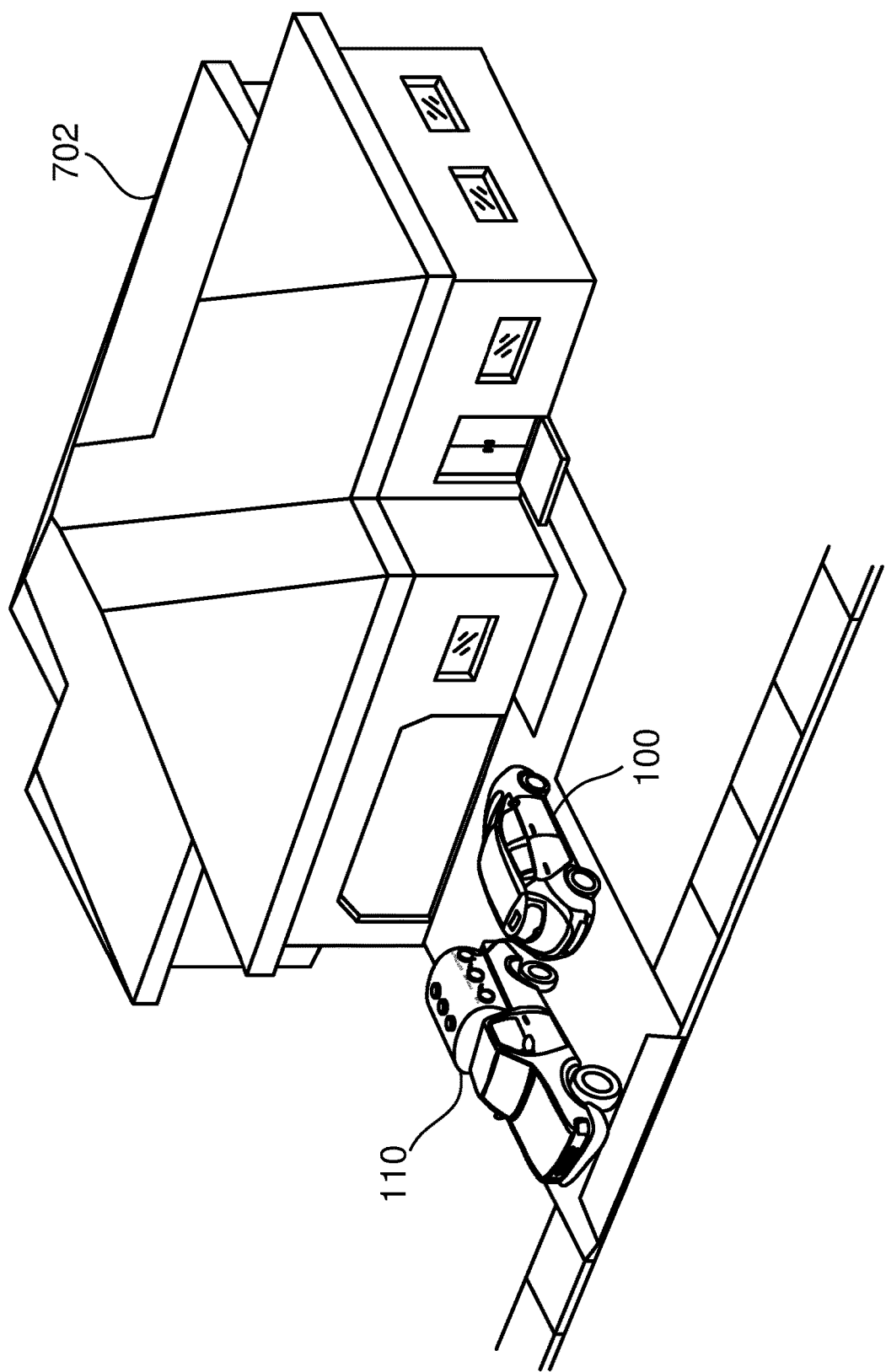
FIG. 7 is a perspective view of a customer receiving fuel in the driveway of his residence.
Figure 8:
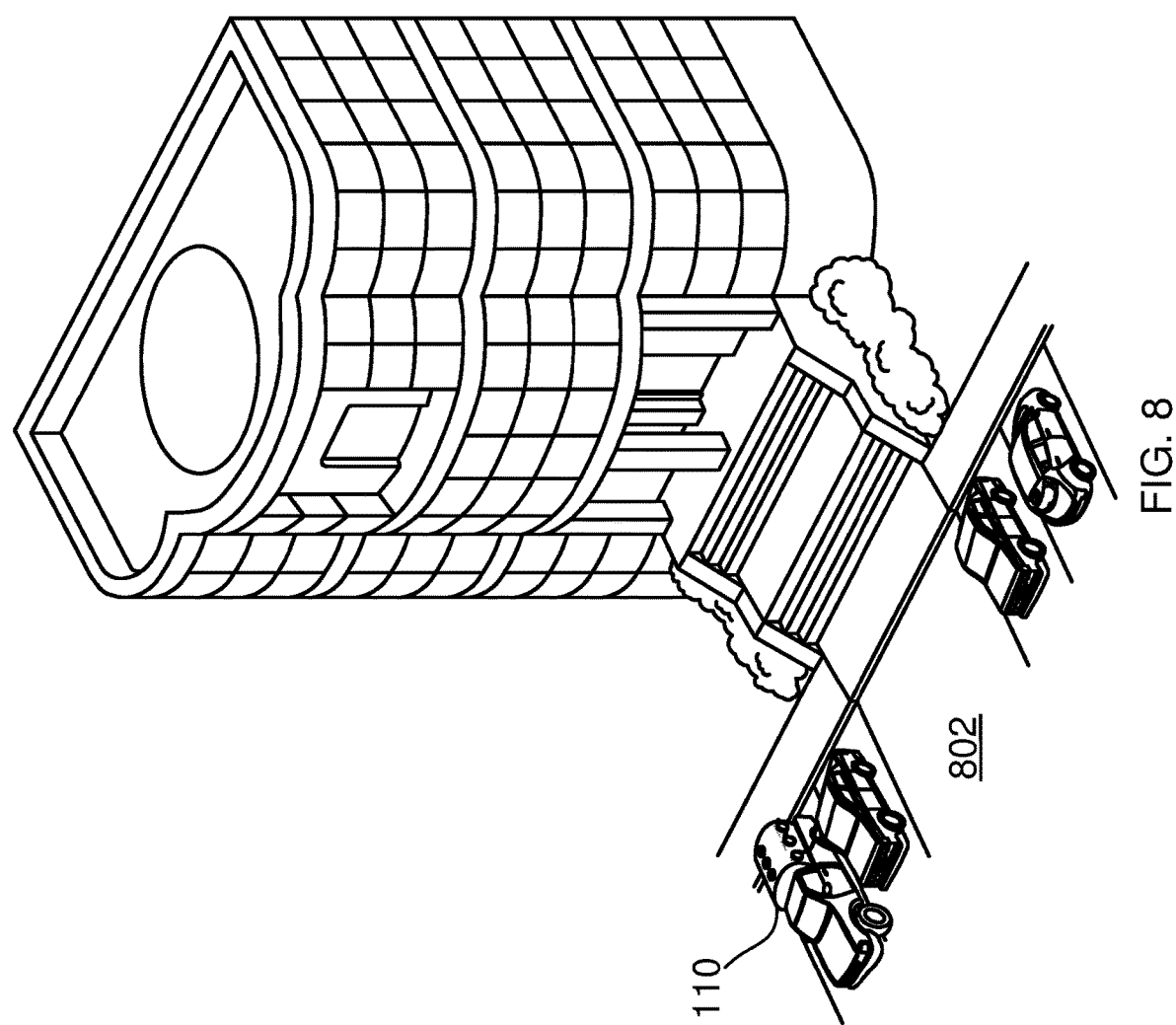
FIG. 8 is a perspective view of a customer receiving fuel in the parking lot of his workplace.

Referring to FIG. 3A, through the preferred app running on the smart phone 104, the customer is also given the option of where to receiving a fueling service. The customer can choose to receive fuel at his current location or at some other pre-programmed location, such as at his residence 702 (see FIG. 7), the parking lot 802 or garage of his workplace (See FIG. 8). Naturally, when fueling is accomplished at these locations, the vehicle does not need to be attended and the customer does not waste his time waiting for the operation to be completed.

Figure 9:
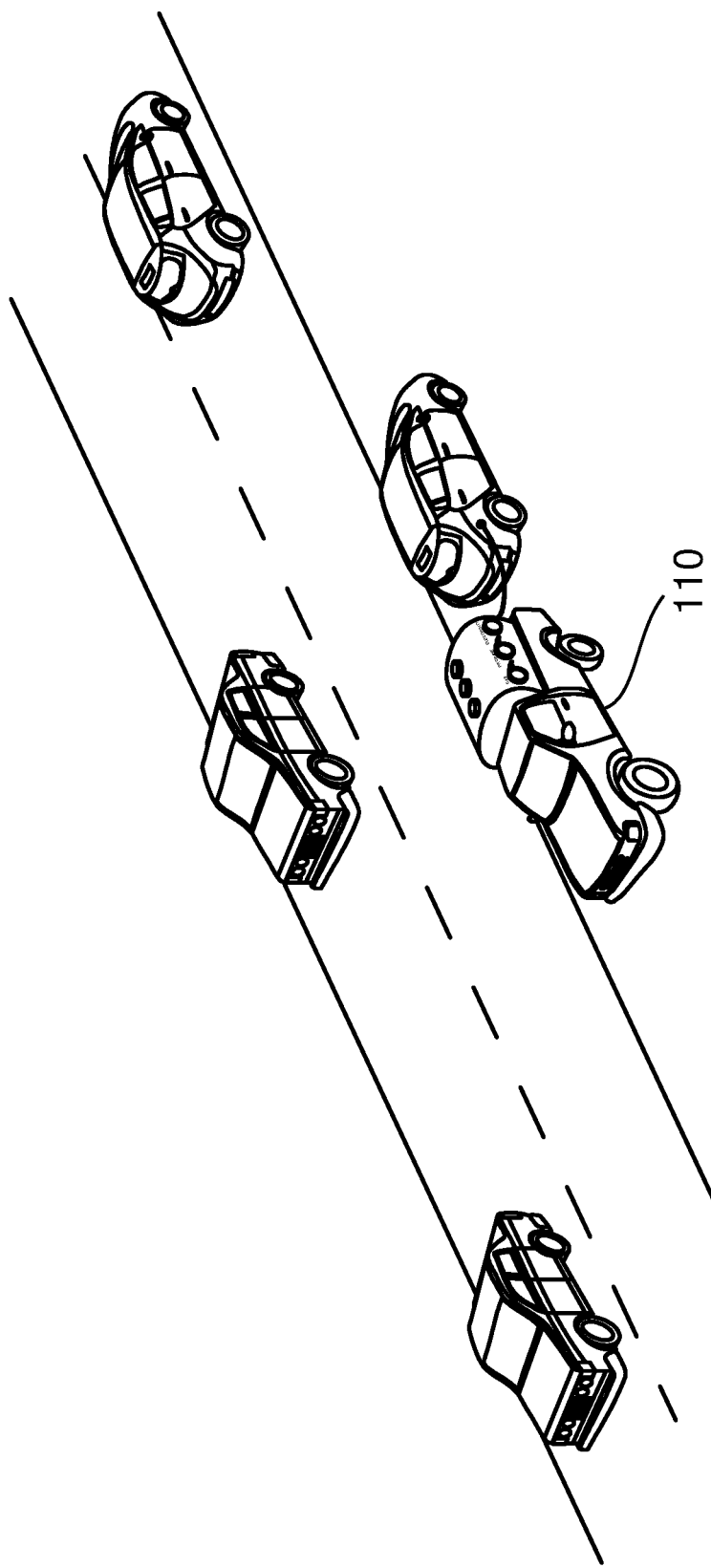
FIG. 9 is a perspective view of a customer receiving fuel on the side of the road.

In a more urgent situation, such as when the range is very low or even when the vehicle has already run out of fuel, the customer can receive fuel on the side of the road (see FIG. 9). The preferred app also gives the customer the option to select from nearby points of interest (POI's) that are either stored in the app or provided by the data processing hub. Such POI's could include locations, such as shopping malls or public parking lots.

Preferably, the customer app provides its user a suggested location to receive fuel from the system based on current vehicle location, current location of members of the fleet of mobile fuel stations and at least one other factor selected from the group consisting of traffic, available parking, proximity to home or work and prior fueling locations for that user.

Referring to FIG. 3B, the system also preferably allows the customer to select services in addition to fueling. For example, the user may select one of the following services: (a) tire inflation, (b) fluid level check and top off, (c) oil top off or change, (d) window cleaning or (e) interior cleaning. Preferably, these optional services show up on the app along with the price and time to completion. In the most preferred embodiment, the sensors on the vehicle detect conditions such as low tire pressure or low fluid levels and, through the data link, advise the vehicle driver that one of these services is needed through the app. In some embodiments, certain services may come as part of the fueling. For example, the MFS driver may automatically, clean the vehicle windows, check the tire pressure and oil and other fluid levels as part of the fueling service at no extra charge.

To aid the customer in selecting additional services, the OBD system, through the data link, may also provide suggestions to the customer or the MFS driver. For example, data from the OBD system may indicate conditions that should be remedied, such as a faulty pollution control valve (PCV).

Referring to FIG. 3C, the system also preferably provides the option of ordering beverages and/or snacks through the app that can be delivered by the MFS driver. The system preferably has means of tracking what beverages and snacks are being carried by which mobile fuel station, so that the options provided to the customer are current for the mobile fuel station selected to fuel the vehicle.

Preferably, the system includes the ability to show the price of the fuel to the customer. In the simplest embodiment, the price for each type of fuel is uniform throughout the system, i.e. independent of which MFS driver fulfills the order and independent of the fueling location. In more complex embodiments, the price for each type of fuel may vary depending on certain factors. For example, the price could vary based on the distance the MFS needs to travel to get to the fueling location. In this case, the system could automatically add to the unit price of the fuel purchased or could add or increase a delivery charge. As another example, the price could vary based on the time of day the fueling is requested. In this case, the unit price or delivery charge could be increased if the fueling is requested late at night or during rush hour traffic. In all cases, the system preferably shows the price, including any delivery charges, to the customer at the time the order is placed. Most preferably, the system is able, for example through the onboard sensors, to estimate the volume of fuel needed and provides a total cost estimate to the customer at the time the order is placed.

Preferably, once the order is placed, the customer's app displays instructions to the customer, such as how to prepare for the fuel delivery. For example, depending on the model of the vehicle, the customer may need to unlock the latch on the fuel door. The customer may also need to make sure there is clearance behind, in front or beside the vehicle for the mobile fuel station to approach. The system may be integrated with the vehicle's onboard cameras to check for this clearance. Alternatively, the system includes a proximity sensor, such as one built into the data link, that can detect whether sufficient clearance has been maintained.

In alternative embodiments, particularly when the MFS drivers are independent contractors, the system could provide the option for the MFS drivers to set the price of each type of fuel. In this embodiment, the data processing hub would keep track of that price data and relay it to the customer before placing an order, thus allowing the customer to choose a particular MFS driver based, not only on proximity, but on price as well. For example, the customer could choose to wait longer for an MFS driver to come from a greater distance or make other stops first, if that MFS driver is charging a lower price for the fuel.

Again, in the simplest embodiment, all of the mobile fuel stations in the fleet carry the same types of fuel and provide the same services as the others. In a more complex embodiment, not all mobile fuel stations are alike. For example, the system may have mobile fuel stations that only carry gasoline or only gasoline and diesel. Other mobile fuel stations in that same system may carry propane or natural gas, while still other mobile fuel stations in that same system may carry batteries to charge batteries in electric vehicles or replace spent battery packs. Some mobile fuel stations may be equipped to provide the additional services mentioned above, while others are not. Some may carry beverages and snacks, while others do not. In these embodiments where not all of the mobile fuel stations are the same, the data processing hub takes that into account in making dispatching decisions or in making decisions of which MFS drivers are to be given the opportunity to accept each fuel/service order.

FIG. 4A is a simulated screenshot of the preferred app running on the MFS driver's smart phone 108, which shows a screen displaying multiple opportunities to fill a fueling request. In the embodiment where the MFS drivers are independent contractors, each MFS driver can view these opportunities when they appear on the map displayed on the app screen. The first MFS that accepts the opportunity is then given the dispatch information from the data processing hub through the app on his smart phone (see FIG. 5A).

In the embodiments where the MFS drivers are given the option of accepting or declining refueling orders, it is preferred that the MFS driver's app is configured to display the estimated revenue associated with each refueling order. With data from the data processing hub, the system, either at the data processing hub or on the MFS driver's smart phone or other device, can calculate this number based on the type of fuel, the unit selling price and cost of the fuel, the volume of fuel, the distance to travel to the fueling location, etc.

Most preferably, in the embodiments where MFS drivers are independent contractors, the MFS driver's app displays estimated or actual revenue numbers for each day, week and/or month, based on the fueling orders fulfilled and other relevant data.

FIG. 4B is a simulated screenshot of the preferred app running on the customer's smart phone 104. Preferably, the screen also displays the estimated time it would take each of the mobile fuel stations to reach the fueling location. Also, the app preferably also displays alternative fueling locations, such as those pre-programmed by the customer, as mentioned above. Most preferably, the app also displays nearby alternative fueling locations, selected from POI's, such as shopping malls or public parking lots, stored by the system.

In the embodiments where the customer can select the particular mobile fuel station or MFS driver, the app would give the customer that option by allowing a tap on the mobile fuel station on the display to thereby select the mobile fuel station to fulfill the fueling request. Also, in the embodiments where the unit price of the fuel can vary between mobile fuel stations, the price charged by each mobile fuel station is also be displayed by the app. In addition, where not all mobile fuel stations offer the same services, the services that are offered by each mobile fuel station is preferably displayed by the app or filtered for the ones able to provide a requested service. Alternatively, the customer specifies, through the app, the fueling location, the grade of fuel, any additional services and any beverages or snacks; whereupon the app shows only those mobile fuel stations able to handle the customer's order.

Preferably, to use the mobile fuel system, a customer, i.e. the vehicle owner/driver, registers with the system, most preferably through the app running on the customer's smart phone. Alternatively, the customer can register on a computer or other device. When registering, the customer enters data to identify himself or herself, to identify the vehicle or vehicles for fueling, to select the fuel type for each vehicle, to select preferred fueling locations, to provide payment information, such as credit card data. Preferably, the data includes photographs of the customer(s), of the vehicle(s) and of the fueling locations. The data also preferably includes information on whether there is a latch that must be unlocked on the fuel door of the vehicle. If there is, the customer should be reminded to unlock the latch. Alternatively, the MFS driver may carry a tool to allow access. Still alternatively, the customer may be provided with an alternative lock to place on the latch that the MFS drivers can open with a special key or code.

Figures 5A, 5B:
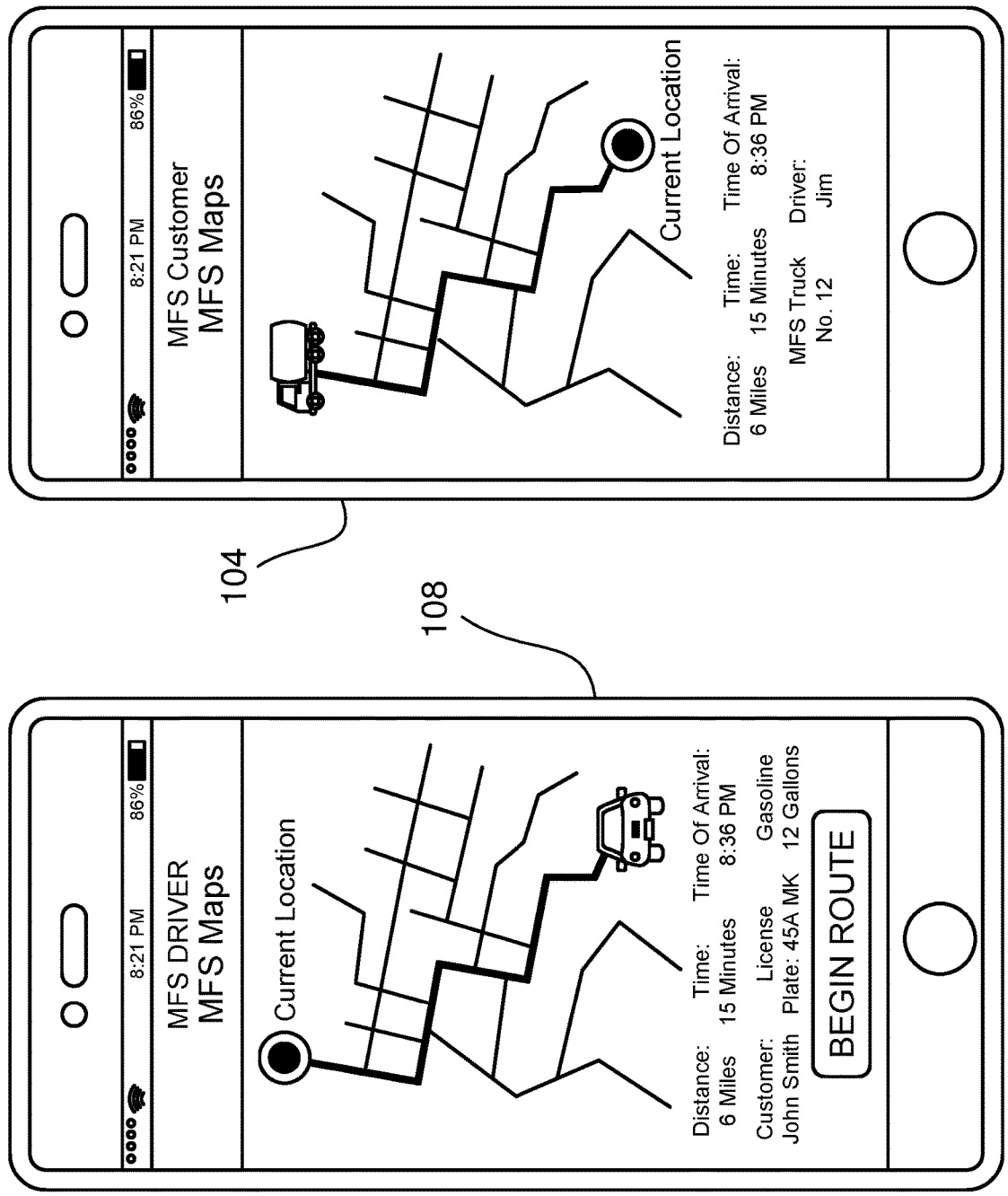
FIG. 5A is simulated screenshot of the MFS's driver's app showing a customer to go and fill.
FIG. 5B is a simulated screenshot of the customer's app showing the location of the MFS truck coming to fuel his vehicle.

FIG. 5A, a simulated screenshot of the MFS driver's app, illustrates how the app provides the dispatch information to the MFS driver, including the fueling location, the distance and time estimated to travel to the fueling location, the customer's name, the license plate of the car to be fueled, the type and estimated volume of fuel to be supplied. The MFS driver receives navigation guidance from the app once the "Begin Route" button is pressed. Preferably, the system takes advantage of the GPS radio in the MFS driver's smart phone 108. Alternative, the mobile fuel station can be equipped with its own GPS and navigation system and display. FIG. 6A is a simulated screenshot of the MFS driver's app, which shows the driver's progress along the route to the fueling location.

FIG. 5B, a simulated screenshot of the customer's app, illustrates how the app provides the fuel delivery information to the customer, including the MFS truck number, the MFS driver's name, the distance the MFS truck will travel to reach the customer and the estimated time that travel will take. FIG. 6B illustrates an update to that travel information as the MFS driver makes his way to the fueling location.

Figure 10:
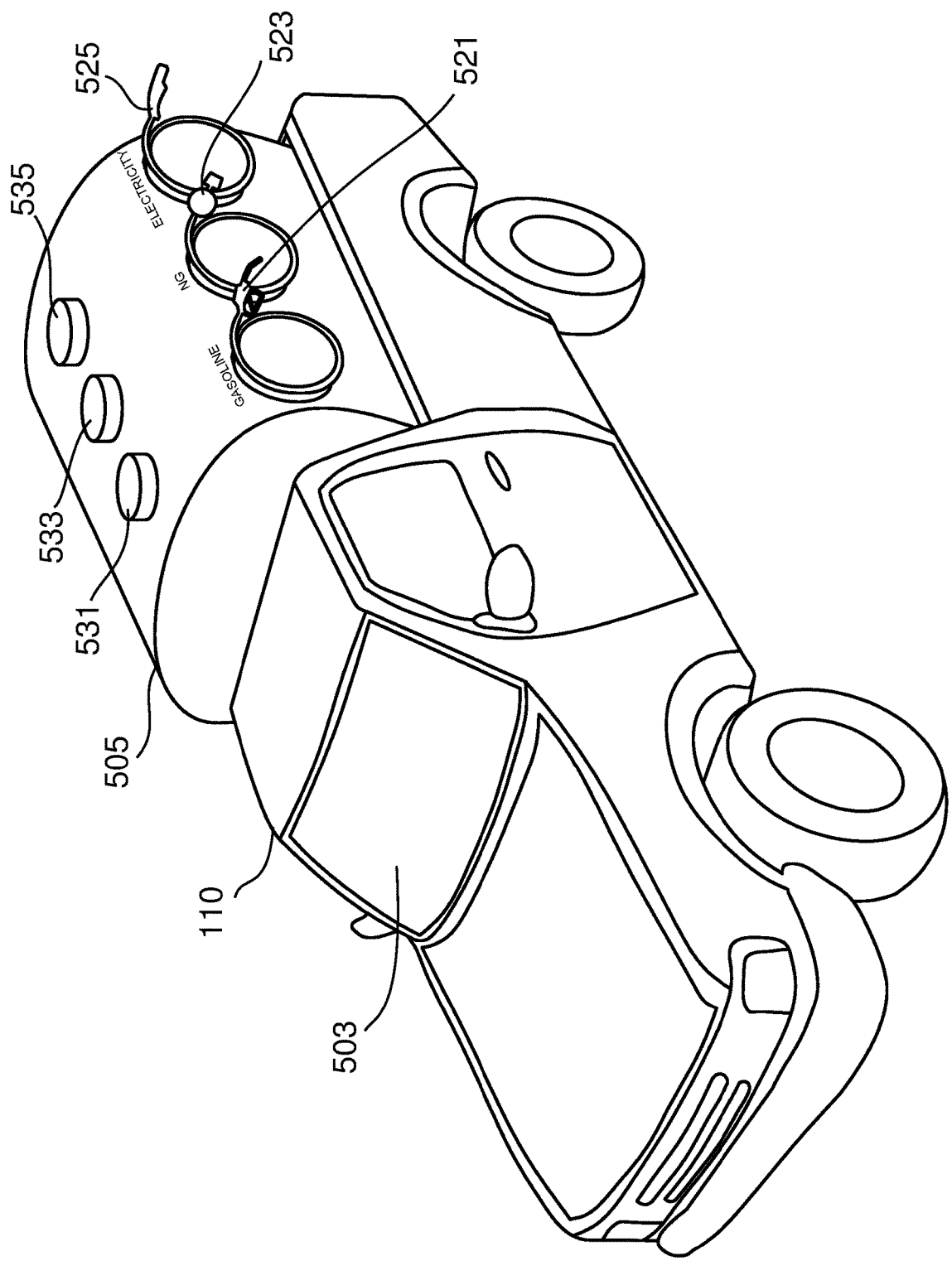
FIG. 10 is a perspective view of a mobile fuel station of the present invention.

FIG. 10 depicts the preferred mobile fuel station 110. For the sake of efficiency and to keep the capital investment low, especially for the embodiments where the MFS drivers are independent contractors, the mobile fuel station is preferably built on a conventional platform, such as a stock pickup truck 501, with the typical cab 503 for the MFS driver. Preferably, a fuel reservoir unit 505 is fitted into the bed of the pickup truck 501. Alternatively, the mobile fuel station can be a built-to-purpose vehicle.

Depending on the precise business model for the mobile fuel system, the pickup truck 501 may be purchased or leased by the MFS driver. The fuel reservoir unit 505 may also be purchased or leased by the MFS driver. Alternatively, all delivery vehicles and equipment are owned by the entity operating the mobile fuel system.

In general, each mobile fuel station is equipped with at least one fuel reservoir adapted to store either liquid fuel, gaseous fuel or electric fuel. The liquid fuel is preferably gasoline, but diesel, ethanol, biodiesel, methanol, and P-series fuels can be delivered. Preferably, each mobile fuel station is equipped with two or more fuel reservoirs, with at least one adapted to carry liquid fuel and at least one adapted to carry electric fuel. More preferably, each mobile fuel station is equipped with three or more fuels reservoirs, with at least one adapted to carry liquid fuel, at least one adapted to carry electric fuel and at least one adapted to carry gaseous fuel. Even more preferably, at least some of the mobile fuel stations carry three reservoirs for liquid fuel, so as to be able to dispense two grades of gasoline and diesel. The number, type and proportionate size of the reservoirs on the mobile fuel stations are preferably based on the predicted and/or demonstrated need for each of the types of fuel being carried.

In the mobile fuel station 110 depicted in FIG. 10, the fuel reservoir unit 505 includes individual reservoirs for gasoline, natural gas and electricity, i.e. a charging battery. As noted above, it may also be preferable to include a reservoir for more than one grade of gasoline. A reservoir for diesel fuel may also be preferable. For the sake of simplicity, only gasoline, natural gas and electricity are depicted on the mobile fuel station 110.

For delivery, the mobile fuel station 110 includes a hose and nozzle 521 for delivering gasoline. In the simplest embodiment, gravity is used to dispense gasoline through the hose. Alternatively, a pump is used. Preferably, the hose and nozzle are equipped with a sensor that measures the volume of gasoline delivered during each fueling. Preferably, that volume is automatically transmitted to the data processing hub for use in calculating the charge for that fueling. In embodiments where the mobile fuel station is stocked with multiple grades of gasoline and diesel, it is preferable, but not required, that a single hose and nozzle be used to dispense all of these.

The mobile fuel station 110 also includes a hose and connection 523 for delivering a gaseous fuel, preferably natural gas. Other gaseous fuels, such as propane, butane and hydrogen can also be delivered in alternative embodiments. Natural gas may be carried on the mobile fuel station as compressed natural gas (CNG) or liquified natural gas (LNG). Because gaseous fuels are explosive and stored and delivered under high pressure, it is important that the reservoir and delivery apparatus be designed with all safety precautions in mind. For example, it is preferred to include an automated gas sniffer to detect any leaks in the reservoir or during a fueling operation. Such a gas sniffer is preferably wired to alarms and automatic shutoff valves and the like to increase safety of storing, transporting and supplying explosive gases. It is important to measure the amount of gaseous fuel delivered to each vehicle. To accomplish this, the measurement device may be a mass flow meter, a volumetric flow meter, a flow rate meter, or a pressure transducer.

The mobile fuel station 110 also includes a cable and connection 525 for delivering electric power to an electric vehicle. In the depicted embodiment, this is accomplished by the presence of a large rechargeable battery in the electric fuel reservoir together with the circuitry and connections to recharge a battery in an electrical vehicle safely and at the appropriate voltage and current. Because the charging connections vary between electric vehicles, the mobile fuel station is equipped with the different connections to handle the various models of electric vehicles. To measure the amount of charge, the measurement device may comprise an ammeter, voltmeter, electric power meter, or other device capable of measuring how much electrical fuel or energy is dispensed to the vehicle.

In some embodiments, the mobile fuel station is equipped with solar panels to aid in charging the battery or battery packs being carried. In other embodiments, the mobile fuel station may be equipped with a generator to aid in charging the battery or battery packs being carried. Such a generator is preferably powered by the engine driving the mobile fuel station.

Optionally, the mobile fuel station is equipped to handle service requests other than fueling. For example, the mobile fuel station may carry various grades of engine oil if a customer needs to add oil to his vehicle. Other automotive fluids, such as washer fluids, coolants, brake or transmission fluids and the like can also be carried on the mobile fuel station. The mobile fuel station may also be equipped to handle complete oil changes, and thus include equipment to raise the car for easy access and to collect the used oil. The mobile fuel station may also include a jack to aid in changing a flat tire for a customer. The mobile fuel station preferably is equipped with an air pressure gauge and a tire inflator. In addition, the mobile fuel station may include a vacuum for cleaning the interior of the customer's vehicle. The mobile fuel station may also be stocked with glass cleaner and other cleaners, air fresheners and surface protectants that can be used on the customer's vehicle when requested.

Figure 11:
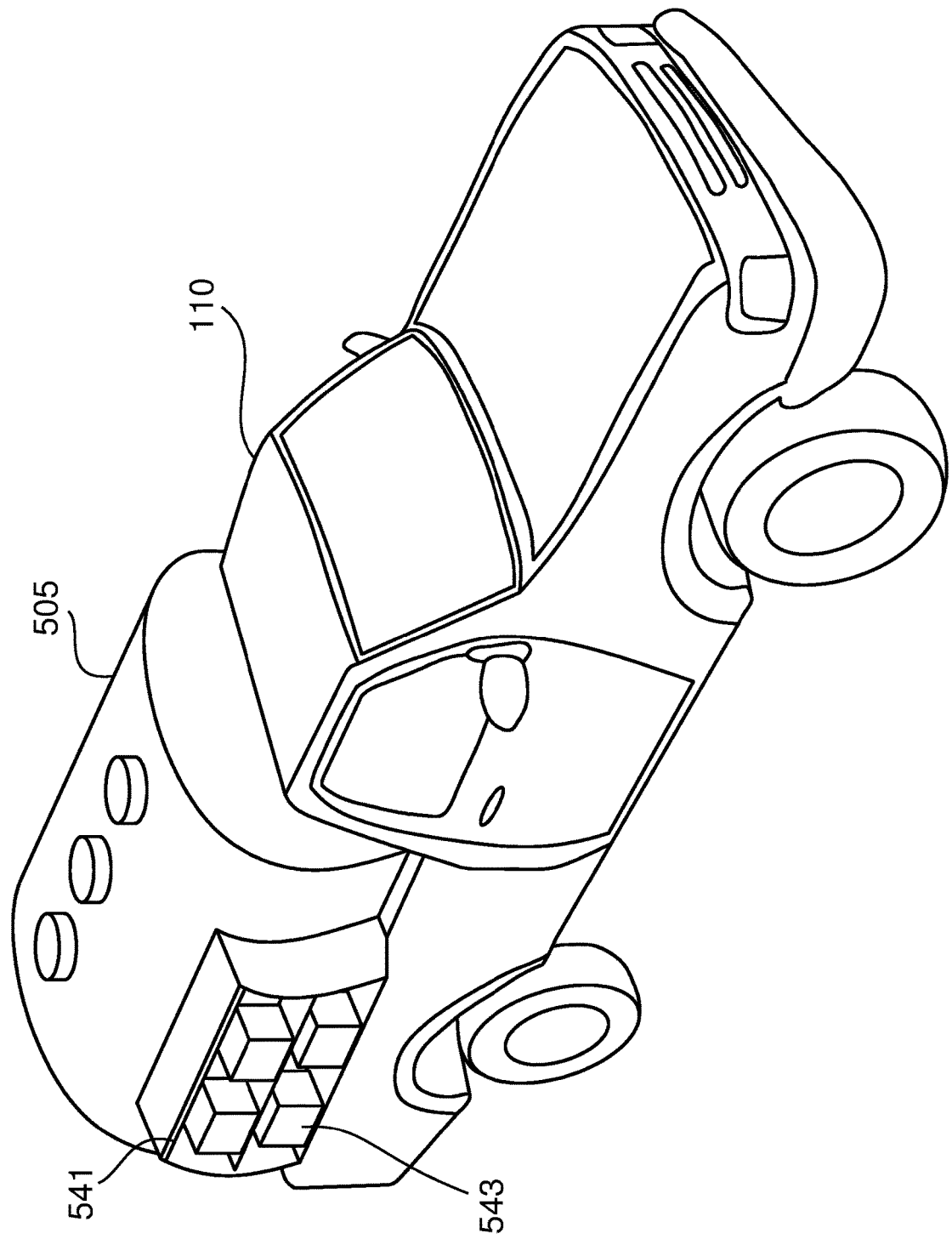
FIG. 11 is a perspective view of a mobile fuel station showing battery packs stowed on the station.
Figure 12:
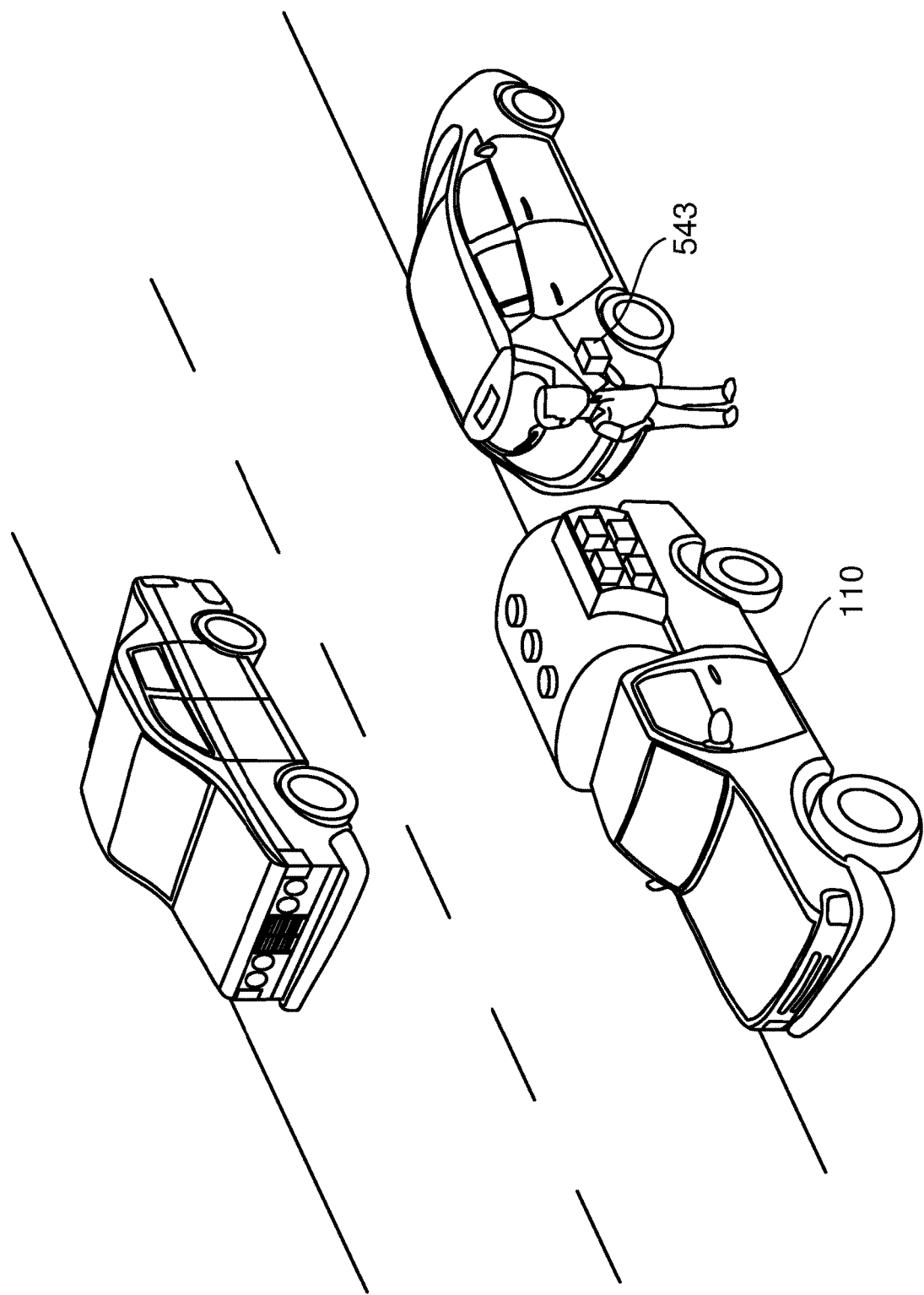
FIG. 12 is a perspective view of a vehicle being fueled by providing a charged battery pack.

FIG. 11 is a view of the other side of the preferred mobile fuel station 110. From this side, one can see an alternative means of delivering electric power to electric vehicles. In particular, the mobile fuel station 110 includes a reservoir, in the form of a compartment 541, that is stocked with battery packs 543, the same battery packs that are used by electric vehicles, see FIG. 12. These battery packs are used by the electric vehicle until the charge is below a certain threshold. At that point, the battery pack is removed and replaced with a fully-charged battery pack from the mobile fuel station. Preferably, the electric vehicle is configured to carry two or more packs to make changing more convenient. In one embodiment, the mobile fuel station includes a robotic mechanism to change the battery packs.

In alternative embodiments, the mobile fuel station carries containers of liquid or gaseous fuel, such as tanks or "bottles" of natural gas. Such containers can be swapped out for depleted containers on the vehicle as the fueling service. Preferably, in this embodiment, the vehicle is designed to allow easy access to the fuel containers, such as by providing an automated fuel door on the side or rear of the vehicle, so as to be particularly suited for autonomous/robotic operation.

Figure 13:
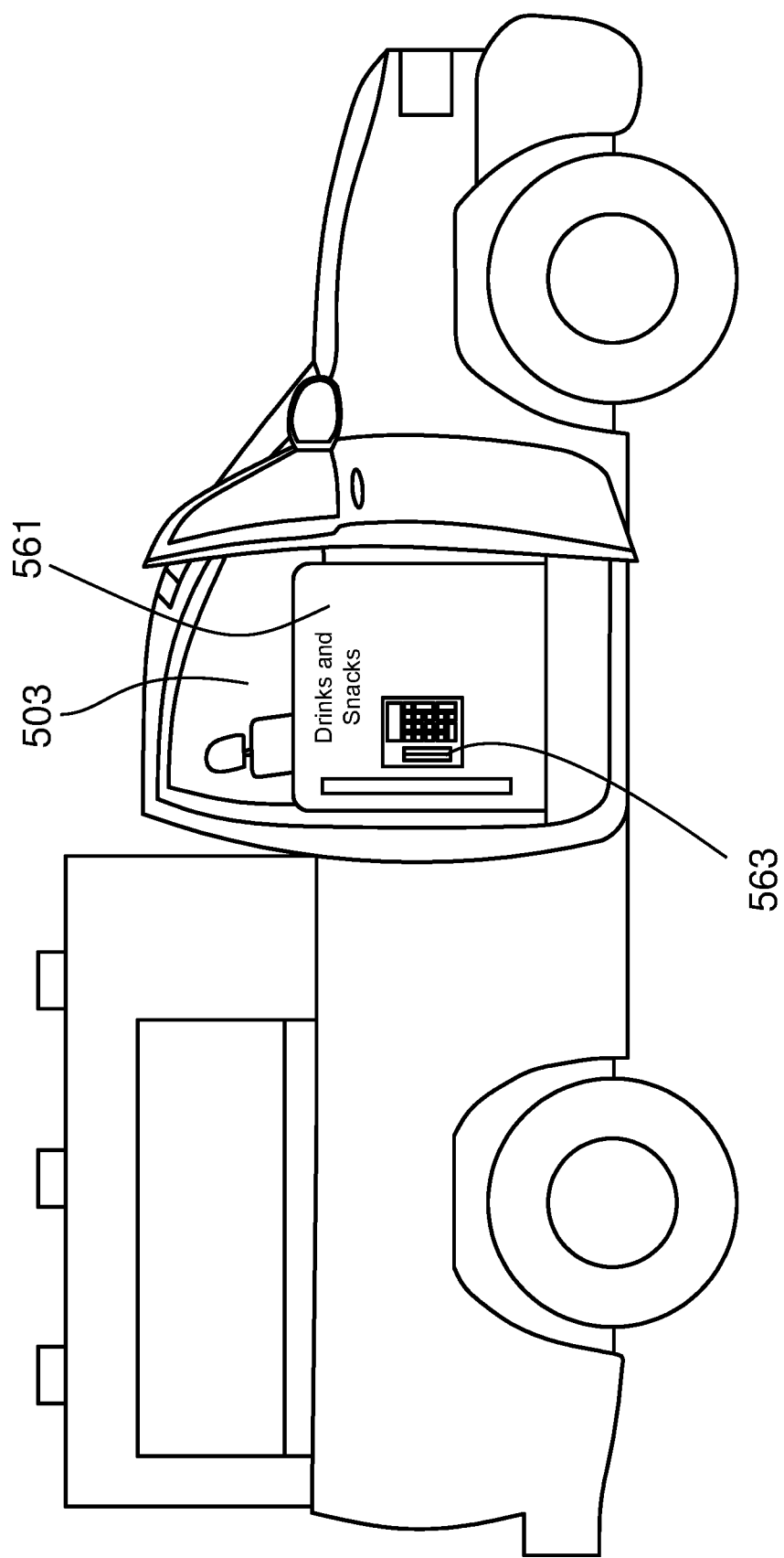
FIG. 13 is a perspective view of a mobile fuel station with a beverages and snacks compartment.

FIG. 13 depicts the mobile fuel station 110 equipped with a unit 561 for storing and dispensing beverages and snacks. Preferably, the unit 561 is located in the cab 503 of the truck, in the space the passenger seat would otherwise occupy. In the simplest embodiment, the unit 561 is a refrigerator with a door and shelves and the MFS driver simply takes out the items purchased by the customer. Alternatively, the unit 561 can be configured like a vending machine that automatically dispenses items based on the customers order through the app or based on order inputs made directly on the outside of the unit 561, such as through the keypad and credit card reader 563. Most preferably, the unit 61 is configured to keep an accurate inventory of the beverages and snacks it contains, for example by scanning UPC's, QR codes or RFID tags when products enter or leave the unit. In some embodiments, depending on location and season, bottles of cold water, cups of coffee or other items may be provided free with the fueling service.

Figure 14:
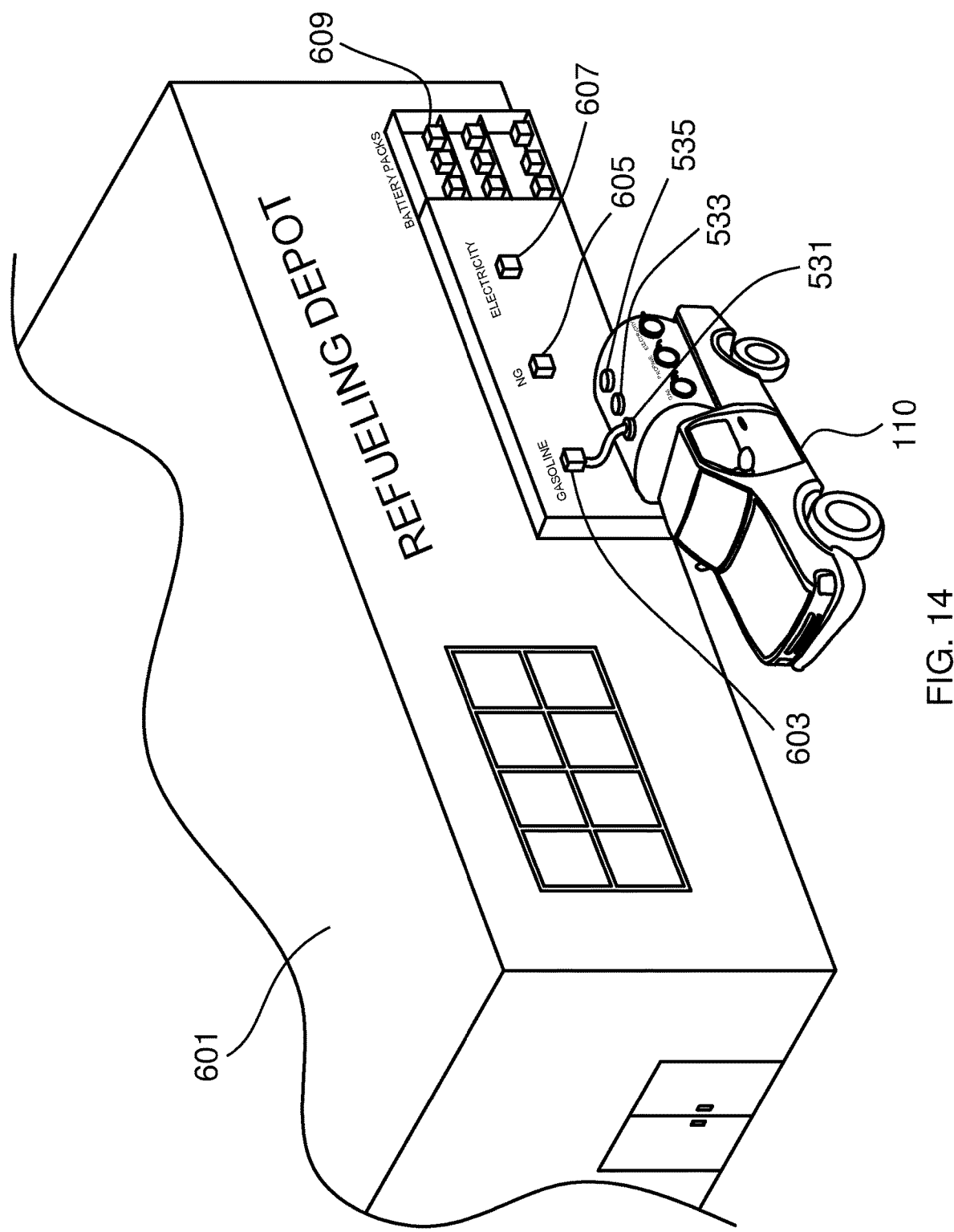
FIG. 14 is perspective view of a mobile fuel station getting resupplied with fuel at a depot.

FIG. 14 depicts a resupply depot 601 for the mobile fuel stations 110. Preferably, the system includes a central resupply depot 601 that services all of the mobile fuel stations in the fleet. Alternatively, and when demand and geography warrant, the system includes multiple resupply depots. Preferably, the resupply depots are equipped to supply all of the types of fuel delivered by the mobile fuel stations, namely liquid (gasoline and diesel) 603, gaseous (natural gas or propane) 605, electrical charge 607, and recharged battery packs 609. The resupply depot may also fill and exchange containers of fuel, such as bottles of natural gas, for depleted ones on the mobile fuel station. Alternatively, the resupply depots provide only one or two of the types of fuel.

The resupply equipment and operation are designed for safety and efficiency. In the simplest embodiment, fuel is added through the ports 531, 533 and 545 on top of each reservoir. In some embodiments, the resupply operation uses a robotic mechanism to make the proper connection and dispense the fuel.

Preferably, the resupply operation includes automatic tracking of the inventory added to mobile fuel station. This can occur through sensors in the dispensing equipment and through sensors on the mobile fuel station. The processor at the data processing hub is preferably configured to compare and reconcile the data from the sensors on the depot dispensing equipment and on the mobile fuel stations.

For simplicity, in the preferred embodiment, the fuel reservoirs are refilled, e.g. with gasoline, natural gas and an electric charge, at the resupply depot 601. Alternative, the mobile fuel stations can be refueled by exchanging a depleted reservoir unit with one that has been replenished. In this embodiment, the mobile fuel station goes to the depot and has the depleted reservoir unit lifted off and a replenished reservoir unit lowered down in its place. In other embodiments, some of the reservoirs are refilled on the mobile fuel station, while others are replaced. For example, the gasoline and natural gas tanks remain on the mobile fuel station and are refueled, while the depleted battery is removed and replaced with a fully charged one.

Figure 15:
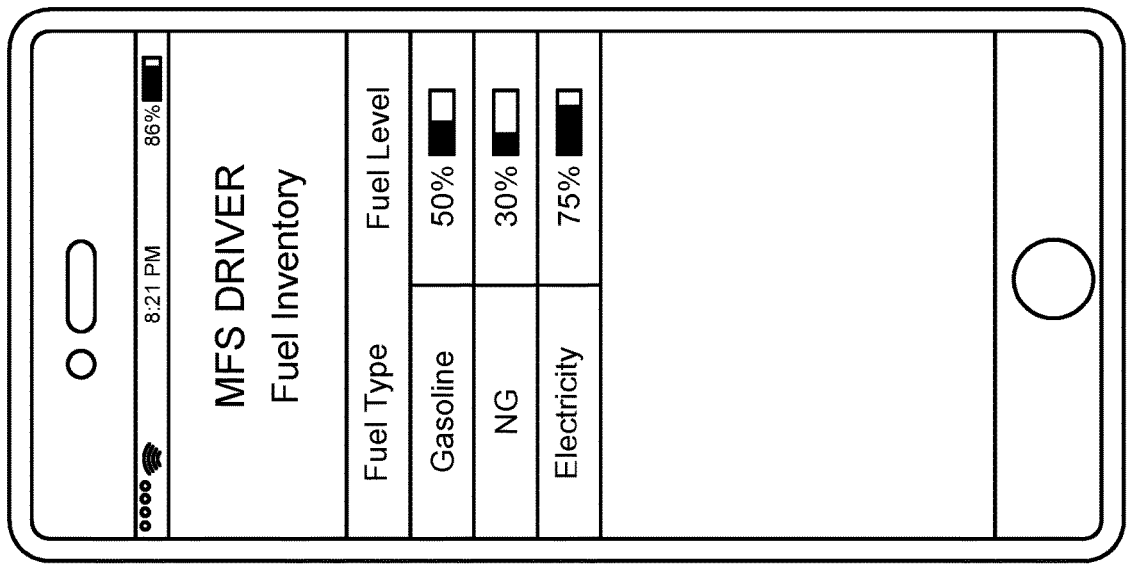
FIG. 15 is a simulated screenshot of the MFS driver's app displaying the levels of each type of fuel in the reservoirs.

Most preferably and as shown in FIG. 15, the app for the MFS driver has a screen or screens that display the inventory of each type of fuel on his vehicle. In the embodiment where the MFS driver is an independent contractor, the app also tracks the cost of resupply each type of fuel. In this embodiment, the data processing hub, through the MFS driver's app, preferably assess the charges for each resupply for each mobile fueling station at the depot. Most preferably, payment for each resupply is made by a credit card or electronic bank withdrawal. Alternatively, the resupply charges are financed by the system for the MFS driver/owner.

In the simplest embodiment, where all of the drivers are employees of the entity operating the system and all of the mobile fuel stations are owned by that same entity, the resupply depot is also owned and operated by that same entity. Alternatively, the system may include multiple resupply depots that are operated by different entities that compete for the business of resupply the mobile fuel stations. Thus, when the MFS drivers are independent contractors, they are given the choice of which resupply station to use, based on factors such as price of each type of fuel, location, level of service and convenience, etc. When multiple resupply depots are independently owned, the MFS driver's app preferably displays the relevant information, such as price, distance and wait times for each depot.

Figure 16:
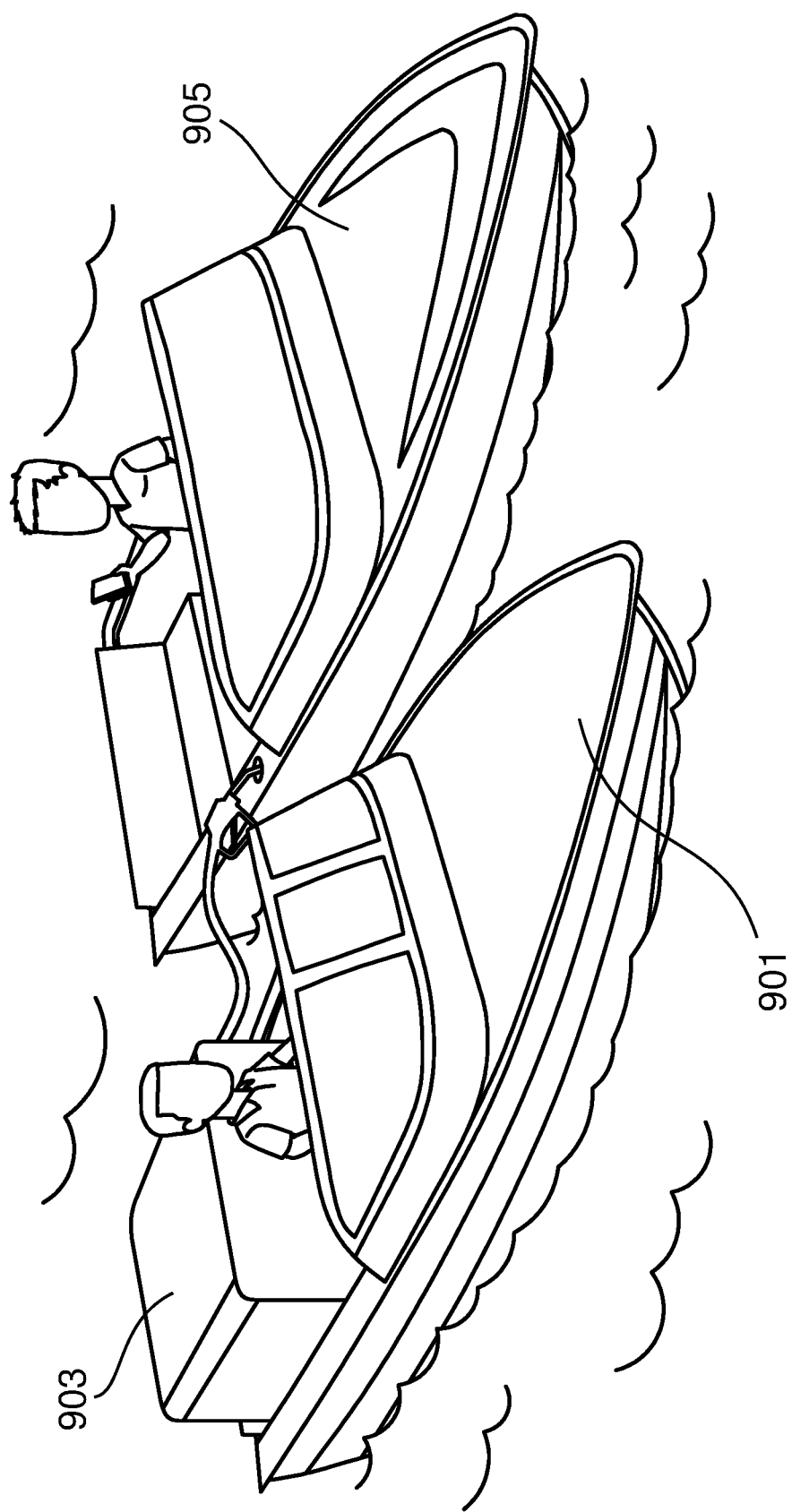
FIG. 16 is a perspective view of a water-based mobile fuel station fueling a boat.

Preferably, the mobile fuel stations are motor driven, wheeled, land-based vehicles, such as the trucks 110 depicted in the figures. Alternatively, and as shown in FIG. 16, the mobile fuel stations are boats 901 or hovercrafts that travel through or over the water to refuel boats 905, ships or other watercraft. The water-based mobile fuel station 901 includes a unit 903 with reservoirs for each of the types of fuels, such as marine gasoline or diesel, required by the customers on the lake, harbor or other body of water serviced by the mobile fuel station 901.

Figure 17:
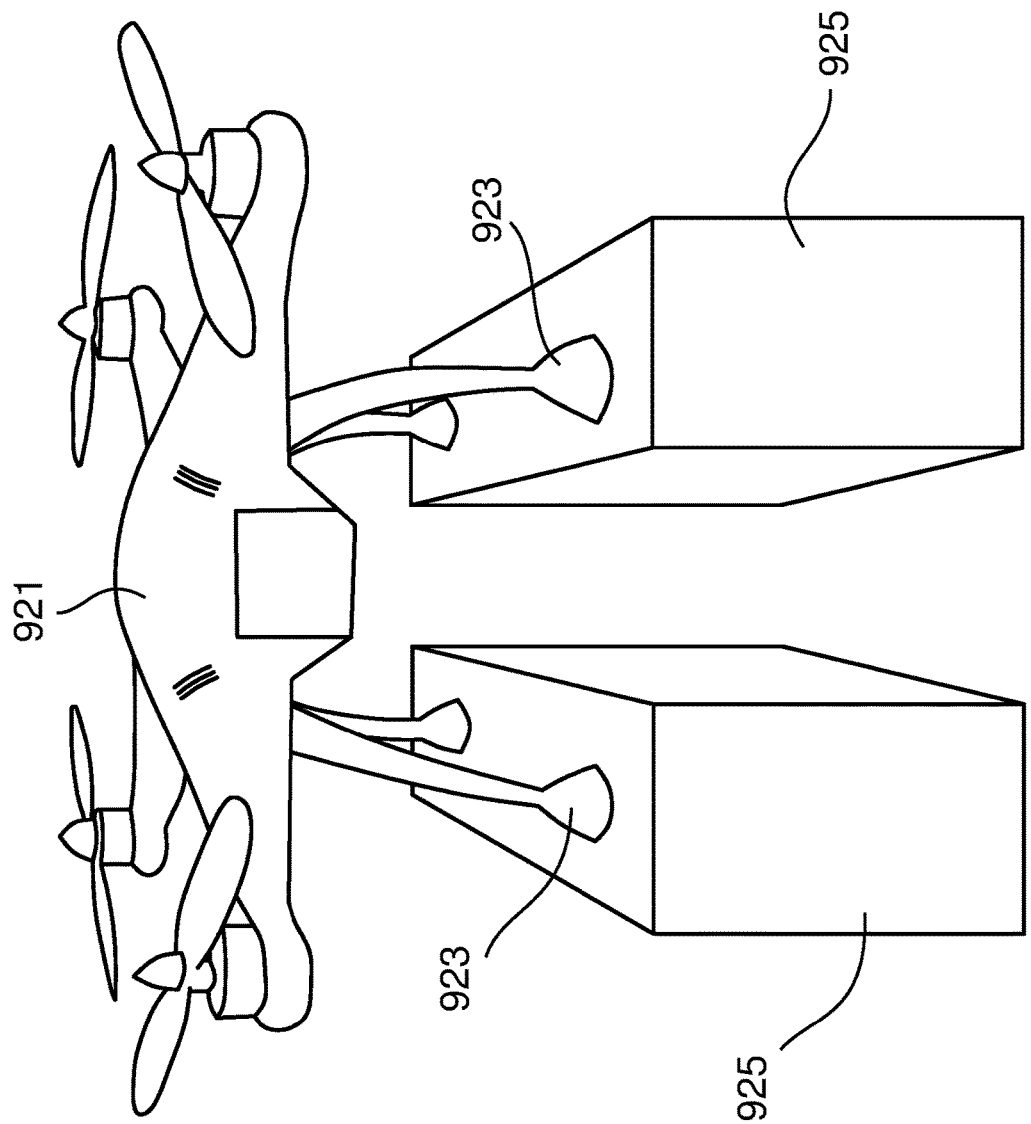
FIG. 17 is a perspective view of a mobile fuel station that is a quad-copter drone.
Figure 18:
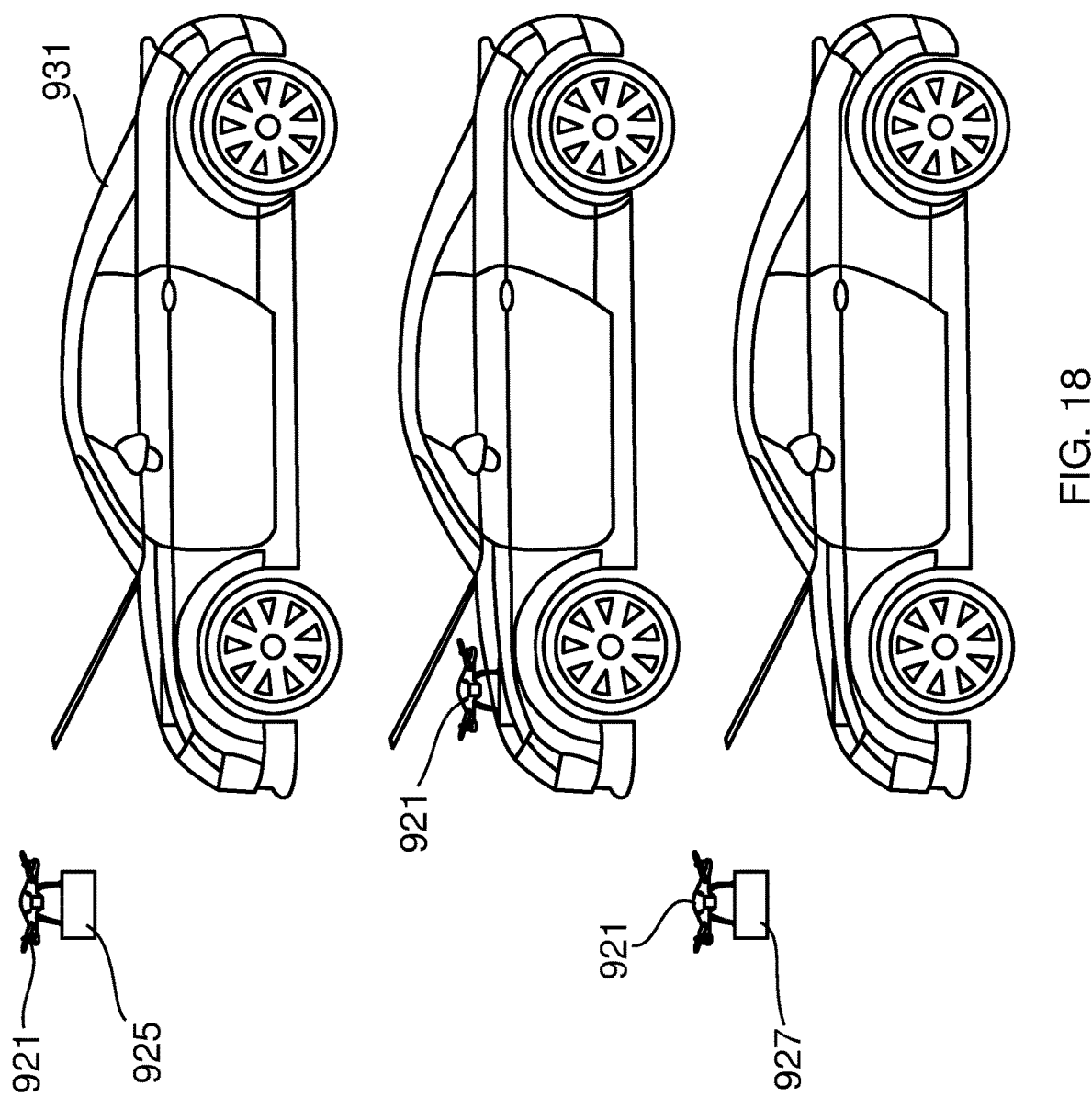
FIG. 18 is a sequence of perspective views of a flying mobile fuel station delivering a charged battery pack to a vehicle.

In another embodiment, which is depicted in FIGS. 17 and 18, the mobile fuel station 921 is a vehicle, such as the drone 921 depicted, that travels through the air to deliver fuel. In this depicted embodiment, the drone includes means for carrying fuel, such as the battery packs 925 held by the attachment mechanisms 923. The fueling operation for this embodiment is depicted in FIG. 18. When the driver of the electric vehicle 931 orders a charged battery pack, the system sends the drone 921 with a charged battery pack 925 to the fueling location. The drone is programed to take out the depleted battery pack 927 and replace it with the charged battery pack 925.

In the preferred embodiment depicted in FIGS. 1-15, the mobile fuel stations 110 are driven and by and the fueling operations are performed by human drivers. Also, the customer vehicles are driven by human drivers. Alternatively, either or both of the mobile fuel stations and customer vehicles are at least partly autonomous, i.e. can be operated without a human driver.

In one embodiment, the mobile fuel stations are capable of autonomous, i.e. driverless, operation and the system, through the data processing hub and by wireless communication, directs the travel of the mobile fuel stations to the fueling locations, waiting locations and the resupply depot location. Preferably, the mobile fuel stations are capable of both human driven and autonomous driven operation. In this embodiment with autonomous driven mobile fuel stations, the mobile fuel stations preferably also include robotic mechanisms to accomplish the fueling operation. Such robotic mechanisms can be pre-programmed to carry out the fueling operation. Alternatively, the robotic mechanisms can be remotely controlled by operators at a remote location, such as the building 106, i.e. at the same location as the data processing hub. Still alternatively, the fueling operation of the autonomous mobile fuel stations can be operated by the customer, similar to using a typical gas pump at a conventional "self-serve" gas station.

In another embodiment, the customer vehicles are also capable of autonomous operation. In this embodiment, the customer vehicles are able to drive themselves to a fueling location. For example, when the customer is at work, his vehicle may drive autonomously to a more convenient fueling location to rendezvous with and get fueled by the mobile fuel station. As another example, an autonomous customer vehicle could drive itself to a convenient location at night when the customer is asleep or otherwise not needing to use the vehicle.

In the preferred embodiment, the customer pays for the fuel and any other services at the time of delivery, through the app with a pre-arranged method, such as a credit card charge. In an alternative embodiment, the system keeps track of the charges to each customer and invoices or automatically takes payment on a monthly or other time basis. In still another alternative embodiment, customers are given the option of pre-paying for fuel and services, most preferably for a discounted rate. In yet still another alternative embodiment, customer's pay a monthly or annual fee based on an observed or predicted usage rate.

All patents and published patent applications referred to herein are incorporated herein by reference. The invention has been described with reference to various specific and preferred embodiments and techniques. Nevertheless, it is understood that many variations and modifications may be made while remaining within the spirit and scope of the invention.

What is claimed is:

1. A mobile fueling system for vehicles comprising:
a fleet of mobile fuel stations, each comprising at least one fuel reservoir adapted to store a fuel type selected from the group consisting of liquid fuel, gaseous fuel, and electric fuel, and comprising dispensing hardware adapted to dispense the fuel type from the at least one fuel reservoir to a vehicle;
a data processing hub; and
a network providing wireless data communication between vehicles and the data processing hub, and between the mobile fuel stations in the fleet and the data processing hub;
wherein the data processing hub is configured to receive vehicle data from vehicles over the network, which vehicle data is transmitted from a customer's smart device running a customer app and wherein the vehicle data comprises vehicle identification, vehicle fuel level and vehicle location;
wherein the data processing hub is also configured to receive fleet data from each mobile fuel station in the fleet over the network, which fleet data comprises an identifier for each mobile fuel station, fuel level for each fuel reservoir, and location for each mobile fuel station; and
wherein the data processing hub is further configured to dispatch, via the network, the mobile fuel stations in the fleet to vehicles in need of fuel based on at least four of the factors selected from the group consisting of vehicle fuel level, a vehicle fuel request, vehicle location, a vehicle owner stored fueling location preference, a vehicle owner service request, reservoir fuel contents, reservoir fuel level, and mobile fuel station location; and wherein the customer app alerts its user when the vehicle fuel level gets below a predetermined point and gives its user the option to request fuel from the system.

2. The system of claim 1, wherein the customer's smart device is configured to receive and forward data from onboard vehicle sensors.

3. The system of claim 2, wherein the smart device receives data from the onboard vehicle sensors relating to vehicle fuel level and at least one of fuel range, tire pressure, oil level, oil life, coolant level and coolant temperature.

4. The system of claim 1, wherein the customer app gives its user the option of when and where to receive fuel from the system.

5. The system of claim 1, wherein the customer app gives its user the option of requesting at least one additional service selected from the group consisting of tire inflation, checking vehicle fluid levels, adding or changing engine oil, adding or changing coolant, cleaning glass, washing the car and running vehicle diagnostics.

6. The system of claim 1, wherein the mobile fuel station is stocked with beverages and snacks and wherein the customer app gives its user the option of purchasing a beverage or comestible.

7. The system of claim 1, wherein the customer app provides its user with an estimated time of delivery and cost for the fuel requested, based on a unit price and the amount needed as calculated based on vehicle data from an onboard sensor.

8. The system of claim 1, wherein the data processing hub is configured to store vehicle owner profiles, comprising vehicle identification data, billing data and preferred fueling locations.

9. The system of claim 1, wherein each mobile fuel station carries at least two fuel reservoirs, wherein at least one of the fuel reservoirs is adapted to be exchanged at a resupply depot when depleted.

10. The system of claim 1, wherein at least some members of the fleet of mobile fuel stations carry at least one liquid fuel reservoir and at least one electric fuel reservoir.

11. The system of claim 1, wherein at least some of the reservoirs carrying electric fuel comprise a collection of charged battery packs that can be swapped for depleted battery packs from vehicles.

12. The system of claim 1, wherein at least some members of the fleet of mobile fuel stations are dispatched and arrive at a vehicle fueling location by autonomous driving.

13. The system of claim 1, further comprising a mobile fuel station app running on a mobile device carried by a driver of the mobile fuel station.

14. The system of claim 1 wherein the mobile fuel stations source fuel from different depot stations providing fuel from different sources and wherein a vehicle owner is given the option of which source to receive fuel from together with pricing information associated with each source.

15. The system of claim 1 wherein at least some of the mobile fuel stations are autonomous flying vehicles.

16. A mobile fueling system for vehicles comprising:
a fleet of mobile fuel stations, each comprising at least one fuel reservoir adapted to store a fuel type selected from the group consisting of liquid fuel, gaseous fuel, and electric fuel, and comprising dispensing hardware adapted to dispense the fuel type from the at least one fuel reservoir to a vehicle;
a data processing hub; and
a network providing wireless data communication between vehicles and the data processing hub, and between the mobile fuel stations in the fleet and the data processing hub;
wherein the data processing hub is configured to receive vehicle data from vehicles over the network, which vehicle data is transmitted from a customer's smart device running a customer app and wherein the vehicle data comprises vehicle identification, vehicle fuel level and vehicle location;
wherein the data processing hub is also configured to receive fleet data from each mobile fuel station in the fleet over the network, which fleet data comprises an identifier for each mobile fuel station, fuel level for each fuel reservoir, and location for each mobile fuel station; and
wherein the data processing hub is further configured to dispatch, via the network, the mobile fuel stations in the fleet to vehicles in need of fuel based on at least four of the factors selected from the group consisting of vehicle fuel level, a vehicle fuel request, vehicle location, a vehicle owner stored fueling location preference, a vehicle owner service request, reservoir fuel contents, reservoir fuel level, and mobile fuel station location; and
wherein the customer app provides its user a suggested location to receive fuel from the system based on current vehicle location, current location of members of the fleet of mobile fuel stations and at least one other factor selected from the group consisting of traffic, available parking, proximity to home or work and prior fueling locations for that user.

17. A mobile fueling system for vehicles comprising:
a fleet of mobile fuel stations, each comprising at least one fuel reservoir adapted to store a fuel type selected from the group consisting of liquid fuel, gaseous fuel, and electric fuel, and comprising dispensing hardware adapted to dispense the fuel type from the at least one fuel reservoir to a vehicle;
a data processing hub; and
a network providing wireless data communication between vehicles and the data processing hub, and between the mobile fuel stations in the fleet and the data processing hub;
wherein the data processing hub is configured to receive vehicle data from vehicles over the network, which vehicle data is transmitted from a customer's smart device running a customer app and wherein the vehicle data comprises vehicle identification, vehicle fuel level and vehicle location;
wherein the data processing hub is also configured to receive fleet data from each mobile fuel station in the fleet over the network, which fleet data comprises an identifier for each mobile fuel station, fuel level for each fuel reservoir, and location for each mobile fuel station; and
wherein the data processing hub is further configured to dispatch, via the network, the mobile fuel stations in the fleet to vehicles in need of fuel based on at least four of the factors selected from the group consisting of vehicle fuel level, a vehicle fuel request, vehicle location, a vehicle owner stored fueling location preference, a vehicle owner service request, reservoir fuel contents, reservoir fuel level, and mobile fuel station location; and wherein the at least one reservoir contains gasoline.

18. A mobile fueling system for vehicles comprising:
a fleet of mobile fuel stations, each comprising at least one fuel reservoir adapted to store a fuel type selected from the group consisting of liquid fuel, gaseous fuel, and electric fuel, and comprising dispensing hardware adapted to dispense the fuel type from the at least one fuel reservoir to a vehicle;
a data processing hub; and
a network providing wireless data communication between vehicles and the data processing hub, and between the mobile fuel stations in the fleet and the data processing hub;
a resupply depot owned and operated by one entity and wherein at least some of the mobile fuel stations are owned and operated by independent contractors and wherein the system is configured to automatically charge the independent contractors for the fuel supplied by the resupply depot;
wherein the data processing hub is configured to receive vehicle data from vehicles over the network, which vehicle data is transmitted from a customer's smart device running a customer app and wherein the vehicle data comprises vehicle identification, vehicle fuel level and vehicle location;
wherein the data processing hub is also configured to receive fleet data from each mobile fuel station in the fleet over the network, which fleet data comprises an identifier for each mobile fuel station, fuel level for each fuel reservoir, and location for each mobile fuel station; and
wherein the data processing hub is further configured to dispatch, via the network, the mobile fuel stations in the fleet to vehicles in need of fuel based on at least four of the factors selected from the group consisting of vehicle fuel level, a vehicle fuel request, vehicle location, a vehicle owner stored fueling location preference, a vehicle owner service
request, reservoir fuel contents, reservoir fuel level, and mobile fuel station location.

19. The system of claim 18 wherein the mobile fuel station app is configured to relay a fuel delivery opportunity from the data processing hub, which at least a first of the independent contractors is given the option to fulfill and wherein the system is configured to provide that fuel delivery opportunity to at least a second of the independent contractors if not fulfilled by the at least first of the independent contractors.

20. The system of claim 19 wherein the mobile fuel station app and data processing hub are configured to provide the independent contractors a projected revenue with each fuel delivery opportunity, based on at least two of the factors selected from the group consisting of fuel type requested, volume of fuel requested, cost of fuel requested, selling price of fuel requested and distance to vehicle fueling location.

21. The system of claim 18 wherein the mobile fuel station app is configured to relay a fuel delivery opportunity from the data processing hub, which two or more of the independent contractors is given the option to fulfill and wherein the system is configured to provide that fuel delivery opportunity to the first of the independent contractors who accepts it.

* * * * *